US012469005B2

(12) United States Patent
Ghosh et al.

(10) Patent No.: US 12,469,005 B2
(45) Date of Patent: Nov. 11, 2025

(54) METHODS AND SYSTEMS FOR CREATING REFERENCE IMAGE TEMPLATES FOR IDENTIFICATION OF PRODUCTS ON PRODUCT STORAGE STRUCTURES OF A PRODUCT STORAGE FACILITY

(71) Applicant: Walmart Apollo, LLC, Bentonville, AR (US)

(72) Inventors: Ashlin Ghosh, Ernakulam (IN); Raghava Balusu, Achanta (IN); Abhinav Pachauri, Kanpur (IN); Avinash M. Jade, Bangalore (IN); Lingfeng Zhang, Dallas, TX (US); Amit Jhunjhunwala, Bangalore (IN); William Craig Robinson, Jr., Centerton, AR (US); Benjamin R. Ellison, San Francisco, CA (US); Srinivas Muktevi, Bengaluru (IN); Zhaoliang Duan, Frisco, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 320 days.

(21) Appl. No.: 18/158,983

(22) Filed: Jan. 24, 2023

(65) Prior Publication Data
US 2024/0249239 A1 Jul. 25, 2024

(51) Int. Cl.
*G06Q 10/087* (2023.01)
*G06Q 10/10* (2023.01)
(52) U.S. Cl.
CPC .................. *G06Q 10/087* (2013.01)
(58) Field of Classification Search
CPC ................................................. G06Q 10/087
(Continued)

(56) References Cited

U.S. PATENT DOCUMENTS 5,074,594 A 12/1991 Laganowski
6,570,492 B1 5/2003 Peratoner
(Continued)

FOREIGN PATENT DOCUMENTS

CN 106347550 B 8/2019
CN 110348439 B 10/2019
(Continued)

OTHER PUBLICATIONS

U.S. Appl. No. 17/963,751, filed Oct. 11, 2022, Yilun Chen.
(Continued)

*Primary Examiner* — Garcia Ade
(74) *Attorney, Agent, or Firm* — Foley IP Law, PLLC

(57) ABSTRACT

Systems and methods of creating reference template images for detecting and recognizing products at a product storage facility include an image capture device having a field of view that includes a product storage structure of the product storage facility, and a computing device including a control circuit and being communicatively coupled to the image capture device. The computing device obtains images of the product storage structure captured by the image capture device, analyzes the obtained images to detect individual ones of the products located on the product storage structure. Then, the computing device identifies the individual ones of the products detected in the images and crops each of the individual ones of the identified products from the images to generate cropped images. The computing device then creates a cluster of the cropped images, and selects one of the cropped images as a reference template image of an identified individual product.

20 Claims, 11 Drawing Sheets

(58) Field of Classification Search
USPC .......................................................... 705/28
See application file for complete search history.

(56) References Cited

U.S. PATENT DOCUMENTS

| | | | |
|---|---|---|---|
| 8,923,650 | B2 | 12/2014 | Wexler |
| 8,965,104 | B1 | 2/2015 | Hickman |
| 9,275,308 | B2 | 3/2016 | Szegedy |
| 9,477,955 | B2 | 10/2016 | Goncalves |
| 9,526,127 | B1 | 12/2016 | Taubman |
| 9,576,310 | B2 | 2/2017 | Cancro |
| 9,659,204 | B2 | 5/2017 | Wu |
| 9,811,754 | B2 | 11/2017 | Schwartz |
| 9,996,818 | B1* | 6/2018 | Ren ................. G06F 16/5866 |
| 10,002,344 | B2 | 6/2018 | Wu |
| 10,019,803 | B2 | 7/2018 | Venable |
| 10,032,072 | B1 | 7/2018 | Tran |
| 10,129,524 | B2 | 11/2018 | Ng |
| 10,210,432 | B2 | 2/2019 | Pisoni |
| 10,373,116 | B2 | 8/2019 | Medina |
| 10,572,757 | B2 | 2/2020 | Graham |
| 10,592,854 | B2 | 3/2020 | Schwartz |
| 10,839,452 | B1 | 11/2020 | Guo |
| 10,922,574 | B1 | 2/2021 | Tariq |
| 10,943,278 | B2 | 3/2021 | Benkreira |
| 10,956,711 | B2 | 3/2021 | Adato |
| 10,990,950 | B2 | 4/2021 | Garner |
| 10,991,036 | B1 | 4/2021 | Bergstrom |
| 11,036,949 | B2 | 6/2021 | Powell |
| 11,055,905 | B2 | 7/2021 | Tagra |
| 11,087,272 | B2 | 8/2021 | Skaff |
| 11,151,426 | B2 | 10/2021 | Dutta |
| 11,163,805 | B2 | 11/2021 | Arocho |
| 11,276,034 | B2 | 3/2022 | Shah |
| 11,282,287 | B2 | 3/2022 | Gausebeck |
| 11,295,163 | B1 | 4/2022 | Schoner |
| 11,308,775 | B1 | 4/2022 | Sinha |
| 11,409,977 | B1 | 8/2022 | Glaser |
| 2005/0238465 | A1 | 10/2005 | Razumov |
| 2011/0040427 | A1 | 2/2011 | Ben-Tzvi |
| 2014/0002239 | A1 | 1/2014 | Rayner |
| 2014/0247116 | A1 | 9/2014 | Davidson |
| 2014/0307938 | A1 | 10/2014 | Doi |
| 2015/0363660 | A1 | 12/2015 | Vidal |
| 2016/0203525 | A1 | 7/2016 | Hara |
| 2017/0106738 | A1 | 4/2017 | Gillett |
| 2017/0286773 | A1 | 10/2017 | Skaff |
| 2018/0005176 | A1 | 1/2018 | Williams |
| 2018/0018788 | A1 | 1/2018 | Olmstead |
| 2018/0197223 | A1 | 7/2018 | Grossman |
| 2018/0260772 | A1 | 9/2018 | Chaubard |
| 2019/0025849 | A1 | 1/2019 | Dean |
| 2019/0043003 | A1 | 2/2019 | Fisher |
| 2019/0050932 | A1 | 2/2019 | Dey |
| 2019/0087772 | A1 | 3/2019 | Medina |
| 2019/0163698 | A1 | 5/2019 | Kwon |
| 2019/0197561 | A1 | 6/2019 | Adato |
| 2019/0220482 | A1 | 7/2019 | Crosby |
| 2019/0236531 | A1 | 8/2019 | Adato |
| 2020/0118063 | A1 | 4/2020 | Fu |
| 2020/0246977 | A1 | 8/2020 | Swietojanski |
| 2020/0265494 | A1 | 8/2020 | Glaser |
| 2020/0293828 | A1 | 9/2020 | Wang et al. |
| 2020/0324976 | A1 | 10/2020 | Diehr |
| 2020/0356813 | A1 | 11/2020 | Sharma |
| 2020/0380226 | A1 | 12/2020 | Rodriguez |
| 2020/0387858 | A1 | 12/2020 | Hasan |
| 2021/0023717 | A1 | 1/2021 | Yu et al. |
| 2021/0049541 | A1 | 2/2021 | Gong |
| 2021/0049542 | A1 | 2/2021 | Dalal |
| 2021/0096560 | A1* | 4/2021 | Al-Mohssen ....... A47L 11/4066 |
| 2021/0114826 | A1 | 4/2021 | Simon et al. |
| 2021/0142105 | A1 | 5/2021 | Siskind |
| 2021/0150231 | A1 | 5/2021 | Kehl |
| 2021/0192780 | A1 | 6/2021 | Kulkarni |
| 2021/0216954 | A1 | 7/2021 | Chaubard |
| 2021/0272269 | A1 | 9/2021 | Suzuki |
| 2021/0319684 | A1 | 10/2021 | Ma |
| 2021/0342914 | A1 | 11/2021 | Dalal |
| 2021/0400195 | A1 | 12/2021 | Adato |
| 2022/0043547 | A1 | 2/2022 | Jahjah |
| 2022/0051179 | A1 | 2/2022 | Savvides |
| 2022/0058425 | A1 | 2/2022 | Savvides |
| 2022/0067085 | A1 | 3/2022 | Nihas |
| 2022/0114403 | A1 | 4/2022 | Shaw |
| 2022/0114821 | A1 | 4/2022 | Arroyo |
| 2022/0119208 | A1 | 4/2022 | Du |
| 2022/0138914 | A1 | 5/2022 | Wang |
| 2022/0165074 | A1 | 5/2022 | Srivastava |
| 2022/0222924 | A1 | 7/2022 | Pan |
| 2022/0250843 | A1 | 8/2022 | Yan |
| 2022/0262008 | A1 | 8/2022 | Kidd |

FOREIGN PATENT DOCUMENTS

| | | |
|---|---|---|
| CN | 110443298 B | 2/2022 |
| CN | 114898358 A | 8/2022 |
| EP | 3217324 A1 | 9/2017 |
| EP | 3437031 | 2/2019 |
| EP | 3479298 | 5/2019 |
| WO | 2006113281 A2 | 10/2006 |
| WO | 2017201490 A1 | 11/2017 |
| WO | 2018093796 | 5/2018 |
| WO | 2020051213 A1 | 3/2020 |
| WO | 2021186176 A1 | 9/2021 |
| WO | 2021247420 A2 | 12/2021 |

OTHER PUBLICATIONS

U.S. Appl. No. 17/963,787, filed Oct. 11, 2022, Lingfeng Zhang.
U.S. Appl. No. 17/963,802, filed Oct. 11, 2022, Lingfeng Zhang.
U.S. Appl. No. 17/963,903, filed Oct. 11, 2022, Raghava Balusu.
U.S. Appl. No. 17/966,580, filed Oct. 14, 2022, Paarvendhan Puviyarasu.
U.S. Appl. No. 17/971,350, filed Oct. 21, 2022, Jing Wang.
U.S. Appl. No. 17/983,773, filed Nov. 9, 2022, Lingfeng Zhang.
U.S. Appl. No. 18/102,999, filed Jan. 30, 2023, Han Zhang.
U.S. Appl. No. 18/103,338, filed Jan. 30, 2023, Wei Wang.
U.S. Appl. No. 18/106,269, filed Feb. 6, 2023, Zhaoliang Duan.
U.S. Appl. No. 18/158,925, Jan. 24, 2023, Raghava Balusu.
U.S. Appl. No. 18/158,950, filed Jan. 24, 2023, Ishan Arora.
U.S. Appl. No. 18/158,969, filed Jan. 24, 2023, Zhaoliang Duan.
U.S. Appl. No. 18/158,983, filed Jan. 24, 2023, Ashlin Ghosh.
U.S. Appl. No. 18/161,788, filed Jan. 30, 2023, Raghava Balusu.
U.S. Appl. No. 18/165,152, filed Feb. 6, 2023, Han Zhang.
U.S. Appl. No. 18/168,174, filed Feb. 13, 2023, Abhinav Pachauri.
U.S. Appl. No. 18/168,198, filed Feb. 13, 2023, Ashlin Ghosh.
Chaudhuri, Abon et al.; "A Smart System for Selection of Optimal Product Images in E-Commerce"; 2018 IEEE Conference on Big Data (Big Data); Dec. 10-13, 2018; IEEE; <https://ieeexplore.ieee.org/document/8622259>; pp. 1728-1736.
Chenze, Brandon et al.; "Iterative Approach for Novel Entity Recognition of Foods in Social Media Messages"; 2022 IEEE 23rd International Conference on Information Reuse and Integration for Data Science (IRI); Aug. 9-11, 2022; IEEE; <https://ieeexplore.ieee.org/document/9874231>; pp. 1-6.
Kaur, Ramanpreet et al.; "A Brief Review on Image Stitching and Panorama Creation Methods"; International Journal of Control Theory and Applications; 2017; vol. 10, No. 28; International Science Press; Gurgaon, India; <https://www.researchgate.net/publication/348232877 >; pp. 1-11 pages.
Naver Engineering Team; "Auto-classification of Naver Shopping Product Categories using TensorFlow"; <https://blog.tensorflow.org/2019/05/auto-classification-of-naver-shopping.html>; May 20, 2019; pp. 1-15.
Paolanti, Marine et al.; "Mobile robot for retail surveying and inventory using visual and textual analysis of monocular pictures based on deep learning"; European Conference on Mobile Robots; Sep. 2017, 6 pages.

(56) References Cited

OTHER PUBLICATIONS

Refills; "Final 3D object perception and localization"; European Commision, Dec. 31, 2016, 16 pages.
Retech Labs; "Storx | RetechLabs"; <https://retechlabs.com/storx/>; available at least as early as Jun. 22, 2019; retrieved from Internet Archive Wayback Machine <https://web.archive.org/web/20190622012152/https://retechlabs.com/storx/> on Dec. 1, 2022; pp. 1-4.
Schroff, Florian et al.; "Facenet: a unified embedding for face recognition and clustering"; 2015 IEEE Conference on Computer Vision and Pattern Recognition (CVPR); Jun. 7-12, 2015; IEEE; <https://ieeexplore.ieee.org/document/7298682>; pp. 815-823.
Singh, Ankit; "Automated Retail Shelf Monitoring Using AI"; <https://blog.paralleldots.com/shelf-monitoring/automated-retail-shelf-monitoring-using-ai/>; Sep. 20, 2019; pp. 1-10.
Singh, Ankit; "Image Recognition and Object Detection in Retail"; <https://blog.paralleldots.com/featured/image-recognition-and-object-detection-in-retail/>; Sep. 26, 2019; pp. 1-11.
Tan, Mingxing et al.; "EfficientDet: Scalable and Efficient Object Detection"; 2020 IEEE/CVF Conference on Computer Vision and Pattern Recognition (CVPR); Jun. 13-19, 2020; IEEE; <https://ieeexplore.ieee.org/document/9156454>; 6 pages.
Tan, Mingxing et al.; "EfficientNet: Rethinking Model Scaling for Convolutional Neural Networks"; Proceedings of the 36th International Conference on Machine Learning; 2019; vol. 97; PLMR; <http://proceedings.mlr.press/v97/tan19a.html>; pp. 6105-6114.
Technology Robotix Society; "Colour Detection"; <https://medium.com/image-processing-in-robotics/colour-detection-e15bc03b3f61>; Jul. 2, 2019; pp. 1-6.
Tonioni, Alessio et al.; "A deep learning pipeline for product recognition on store shelves"; 2018 IEEE International Conference on Image Processing, Applications and Systems (IPAS); Dec. 12-14, 2018; IEEE; <https://ieeexplore.ieee.org/document/8708890>; pp. 25-31.
Trax Retail; "Image Recognition Technology for Retail | Trax"; <https://traxretail.com/retail/>; available at least as early as Apr. 20, 2021; retrieved from Internet Wayback Machine <https://web.archive.org/web/20210420132348/https://traxretail.com/retail/> on Dec. 1, 2022; pp. 1-19.
U.S. Appl. No. 16/991,885; Final Rejection mailed Mar. 7, 2022; (pp. 1-13).
U.S. Appl. No. 16/991,885; Notice of Allowance and Fees Due (PTOL-85) mailed Aug. 24, 2022; (pp. 1-13).
U.S. Appl. No. 16/991,885; Notice of Allowance and Fees Due (PTOL-85) mailed Dec. 7, 2022; (pp. 1-13).
U.S. Appl. No. 16/991,885; Notice of Allowance and Fees Due (PTOL-85) mailed Dec. 23, 2022; (pp. 1-2).
U.S. Appl. No. 16/991,885; Office Action mailed Sep. 20, 2021; (pp. 1-13).
U.S. Appl. No. 16/991,980; Non-Final Rejection mailed Sep. 14, 2022; (pp. 1-19).
U.S. Appl. No. 16/991,980; Final Rejection mailed Apr. 7, 2023; (pp. 1-15).
Verma, Nishchal, et al.; "Object identification for inventory management using convolutional neural network"; IEEE Applied Imagery Pattern Recognition Workshop (AIPR); Oct. 2016, 6 pages.
Zhang, Jicun, et al.; "An Improved Louvain Algorithm for Community Detection"; Advanced Pattern and Structure Discovery from Complex Multimedia Data Environments 2021; Nov. 23, 2021; Mathematical Problems in Engineering; Hindawi; <https://www.hindawi.com/journals/mpe/2021/1485592/>; pp. 1-27.
Kari Rodriquez, PCT International Search Report, mailed Apr. 17, 2024, in connection with International Application No. PCT/US2024/11393, all pages.
Kari Rodriquez, PCT Written Opinion, mailed Apr. 17, 2024, in connection with International Application No. PCT/US2024/11393, all pages.

\* cited by examiner

METHODS AND SYSTEMS FOR CREATING REFERENCE IMAGE TEMPLATES FOR IDENTIFICATION OF PRODUCTS ON PRODUCT STORAGE STRUCTURES OF A PRODUCT STORAGE FACILITY

TECHNICAL FIELD

This disclosure relates generally to managing inventory at product storage facilities, and in particular, to creating reference template images for detecting and recognizing products on product storage structures of a product storage facility.

BACKGROUND

A typical product storage facility (e.g., a retail store, a product distribution center, a warehouse, etc.) may have hundreds of shelves and thousands of products stored on the shelves and/or on pallets. Individual products offered for sale to consumers are typically stocked on shelves, pallets, and/or each other in a product storage space having a price tag label assigned thereto. It is common for workers of such product storage facilities to manually (e.g., visually) inspect product display shelves and other product storage spaces to verify whether the on-shelf products are properly labeled with appropriate price tag labels.

Given the very large number of product storage areas such as shelves, pallets, and other product displays at product storage facilities of large retailers, and the even larger number of products stored in the product storage areas, manual inspection of the price tag labels and the products on the shelves/pallets by the workers is very time consuming and significantly increases the operations cost for a retailer, since these workers could be performing other tasks if they were not involved in manually inspecting the product storage areas, price tag labels, and products.

BRIEF DESCRIPTION OF THE DRAWINGS

Disclosed herein are embodiments of creating reference template images for detecting and recognizing products at a product storage facility. This description includes drawings, wherein.

Figure 1:
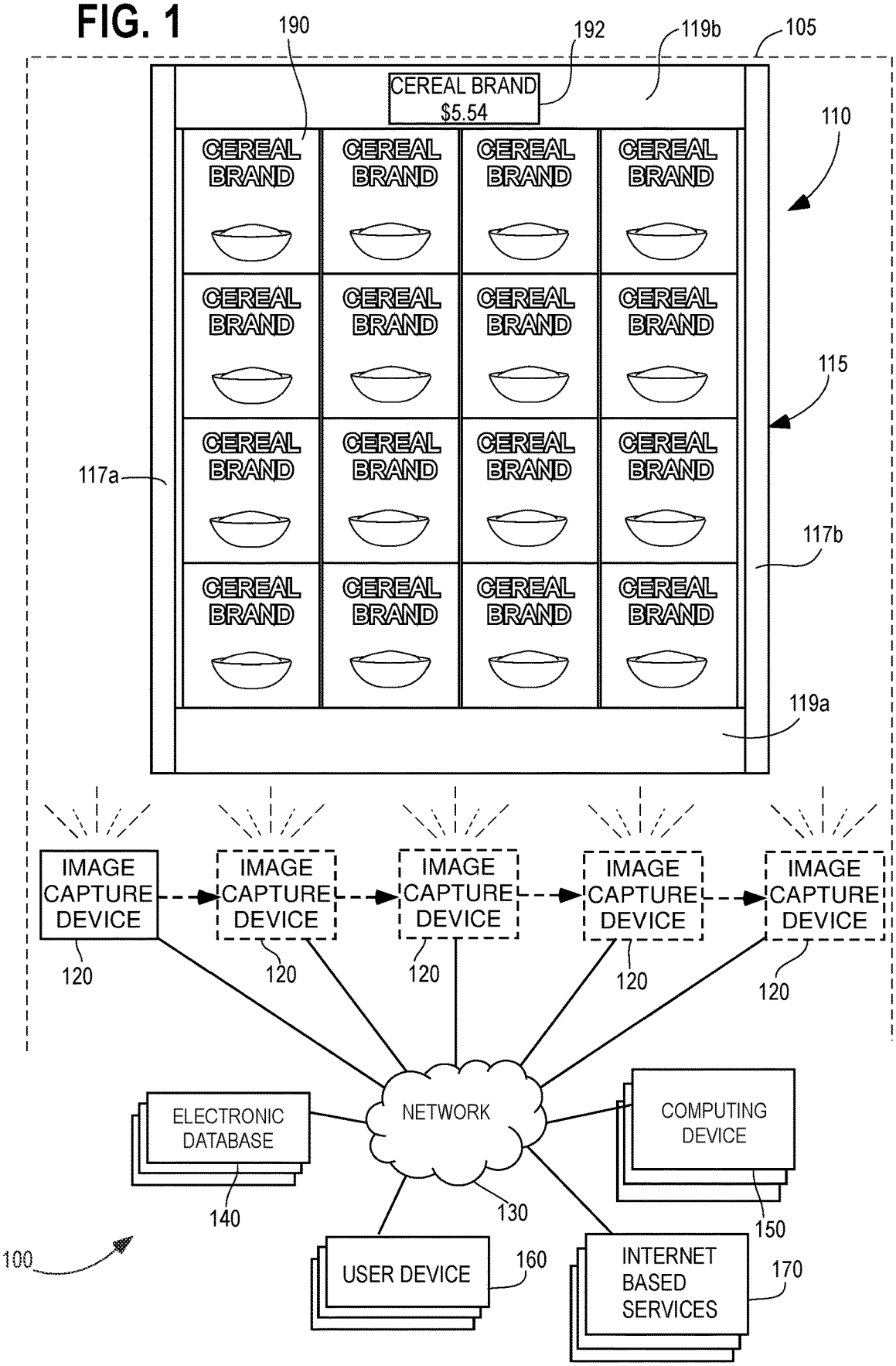
FIG. 1 is a diagram of an exemplary system of creating reference template images for detecting and recognizing products at a product storage facility in accordance with some embodiments, depicting a front view of a product storage structure storing exemplary identical individual products that is being monitored by an image capture device that is configured to move about the product storage facility.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required.

The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, systems and methods of creating reference template images for detecting and recognizing products at a product storage facility include an image capture device having a field of view that includes a product storage structure of the product storage facility, and a computing device including a control circuit and being communicatively coupled to the image capture device. The computing device obtains images of the product storage structure captured by the image capture device, analyzes the obtained images to detect individual ones of the products located on the product storage structure. Then, the computing device identifies the individual ones of the products detected in the images and crops each of the individual ones of the identified products from the images to generate cropped images. The computing device then creates a cluster of the cropped images, and selects one of the cropped images as a reference template image of an identified individual product.

In some embodiments, a system of creating reference template images for detecting and recognizing products at product storage areas of a product storage facility includes an image capture device having a field of view that includes at least a portion of a product storage structure in a product storage area of the product storage facility, the product storage structure having products arranged thereon, wherein the image capture device is configured to capture one or more images of the product storage structure. The system also includes a computing device including a control circuit, the computing device being communicatively coupled to the image capture device. The control circuit is configured to: obtain a plurality of images of the product storage structure captured by the image capture device; analyze the obtained images of the product storage structure captured by the image capture device to detect individual ones of the products located on the product storage structure; based on detection of the individual ones of the products in the images, recognize the individual ones of the products detected in the images as corresponding to a known product identifier; crop each of the individual ones of the recognized products from the images to generate a plurality of cropped images; create a cluster of the cropped images, wherein each of the cropped images in the cluster depicts one of the recognized individual products; and analyze the cluster of the cropped images to select one of the cropped images as a reference template image representing the one of the recognized individual products.

In some embodiments, a method of creating reference template images for detecting and recognizing products at product storage areas of a product storage facility includes: capturing one or more images of a product storage structure in a product storage area of the product storage facility via an image capture device having a field of view that includes the product storage structure, the product storage structure having products arranged thereon; and by a computing device including a control circuit and communicatively coupled to the image capture device: obtaining a plurality of images of the product storage structure captured by the image capture device; analyzing the obtained images of the product storage structure captured by the image capture device to detect individual ones of the products located on the product storage structure; based on detection of the individual ones of the products in the images, recognizing the individual ones of the products detected in the images as corresponding to a known product identifier; cropping each of the individual ones of the recognized products from the images to generate a plurality of cropped images; creating a cluster of the cropped images, wherein each of the cropped images in the cluster depicts one of the recognized individual products; and analyzing the cluster of the cropped images to select one of the cropped images as a reference template image representing the one of the recognized individual products.

FIG. 1 shows an embodiment of a system 100 of creating reference template images for detecting and recognizing products 190 at product storage areas 110 of a product storage facility 105 (which may be a retail store, a product distribution center, a warehouse, etc.). The system 100 is illustrated in FIG. 1 for simplicity with only one movable image capture device 120 that moves about one product storage area 110 containing one product storage structure 115, but it will be appreciated that, depending on the size of the product storage facility 105 being monitored, the system 100 may include multiple movable image capture devices 120 located throughout the product storage facility 105 that monitor hundreds of product storage areas 110 of and thousands of product storage structures 115.

It is understood the direction and type of movement of the image capture device 120 about the product storage area 110 of the product storage facility 105 may depend on the physical arrangement of the product storage area 110 and/or the size and shape of the product storage structure 115. For example, the image capture device 120 may move linearly down an aisle alongside a product storage structure 115 (e.g., a shelving unit) located in a product storage area 110 of a product storage facility 105, or may move in a circular fashion around a table having curved/multiple sides. Notably, while the price tag label 192 is referred to herein as an "on-shelf price tag label," it will be appreciated that the price tag label 192 does not necessarily have to be affixed to horizontal support members 119a or 119b (which may be shelves, etc.) of the product storage structure 115 as shown in FIG. 1 and may be located in a different location (e.g., on the vertical support members 117a-117b (which may be support posts interconnecting the shelves).

Notably, the term "product storage structure" as used herein generally refers to a structure on which the products 190 are stored, and may include a pallet, a shelf cabinet, a single shelf, table, rack, refrigerator, freezer, displays, bins, gondola, case, countertop, or another product display. Likewise, it will be appreciated that the number (e.g., 16 shown in FIG. 1) of individual products 190 representing individual units of an identical product (generically labeled as "Cereal Brand" in FIG. 1, but may be any other retail product that is stocked in a product storage facility) is chosen for simplicity and by way of example only, and that the product storage structure 115 may store any number of units of product 190 thereon. Further, the size and shape of the products 190 in FIG. 1 have been shown by way of example only, and it will be appreciated that the individual products 190 may be of various sizes and shapes. Notably, the term "products" may refer to individual product 190 (some of which may be single-piece/single-component products and some of which may be multi-piece/multi-component products), as well as to packages or containers of the product 190, which may be plastic- or paper-based packaging that includes multiple units of a given product 190 (e.g., a plastic wrap that includes 36 rolls of identical paper towels, a paper box that includes 10 packs of identical diapers, etc.). Alternatively, the packaging of the individual products 190 may be a plastic- or paper-based container that encloses one individual product 190 (e.g., a box of cereal as shown in FIG. 1, a bottle of shampoo, etc.).

The image capture device 120 (also referred to as an image capture unit) of the exemplary system 100 depicted in FIG. 1 is configured for movement about the product storage facility 105 (e.g., on the floor via a motorized or non-motorized wheel-based and/or track-based locomotion system, or via slidable tracks above the floor, etc.) such that, when moving (e.g., about an aisle or other area of a product storage facility 105), the image capture device 120 has a field of view that includes at least a portion the product storage structure 115 within the product storage area 110 of the product storage facility 105, permitting the image capture device 120 to capture multiple images of the product storage area 110 and the product storage structure 115 from various viewing angles. In some embodiments, the image capture device 120 is configured as robotic device that moves without being physically operated/manipulated by a human operator (as described in more detail below). In other embodiments, the image capture device 120 is configured to be driven or manually pushed (e.g., like a cart or the like) by a human operator. In still further embodiments, the image capture device 120 may be a hand-held or a wearable device (e.g., a camera, phone, tablet, or the like) that may be carried and/or work by a worker at the product storage facility 105 while the worker moves about the product storage facility 105. In some embodiments, the image capture device 120 may be incorporated into another mobile device (e.g., a floor cleaner, floor sweeper, forklift, etc.), the primary purpose of which is independent of capturing images of product storage areas 110 of the product storage facility 105.

In some embodiments, as will be described in more detail below, the images of the product storage area 110 captured by the image capture device 120 while moving about the product storage area are transmitted by the image capture device 120 over a network 130 to an electronic database 140 and/or to a computing device 150. In some aspects, the computing device 150 (or a separate image processing internet based/cloud-based service module) is configured to process such images as will be described in more detail below.

The exemplary system 100 includes an electronic database 140. Generally, the exemplary electronic database 140 of FIG. 1 may be configured as a single database, or a collection of multiple communicatively connected databases (e.g., digital image database, meta data database, inventory database, pricing database, customer database, vendor database, manufacturer database, etc.) and is configured to store various raw and processed images (e.g., 180, 182) of the product storage area 110 captured by the image capture device 120 while the image capture device 120 is moving about the product storage facility 105, as well as cropped images 186 of the products 190, as well as various data sets representing image histogram, feature vector, and location information templates associated with the cropped images 186 of the products 190, as well as total counts of products 190 detected on the product storage structures 115 of a product storage facility 105 in the images 180 captured by the image capture device 120.

In some embodiments, the electronic database 140 and the computing device 150 may be implemented as two separate physical devices located at the product storage facility 105. It will be appreciated, however, that the computing device 150 and the electronic database 140 may be implemented as a single physical device and/or may be located at different (e.g., remote) locations relative to each other and relative to the product storage facility 105. In some aspects, the electronic database 140 may be stored, for example, on non-volatile storage media (e.g., a hard drive, flash drive, or removable optical disk) internal or external to the computing device 150, or internal or external to computing devices distinct from the computing device 150. In some embodiments, the electronic database 140 may be cloud-based.

The system 100 of FIG. 1 further includes a computing device 150 (which may be one or more computing devices as pointed out below) configured to communicate with the electronic database 140 (which may be one or more databases as pointed out below), the image capture device 120, user device 160 (which may be one or more user devices as pointed out below), and/or internet-based service 170 (which may be one or more internet-based services as pointed out below) over the network 130. The exemplary network 130 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 may include cloud-based features, such as cloud-based memory storage. In some embodiments, the one or more computing devices 150, one or more electronic databases 140, one or more user devices 160, and/or portions of the network 130 are located at, or in the product storage facility 105.

The computing device 150 may be a stationary or portable electronic device, for example, a desktop computer, a laptop computer, a single server or a series of communicatively connected servers, a tablet, a mobile phone, or any other electronic device including a control circuit (i.e., control unit) that includes a programmable processor. The computing device 150 may be configured for data entry and processing as well as for communication with other devices of system 100 via the network 130. As mentioned above, the computing device 150 may be located at the same physical location as the electronic database 140, or may be located at a remote physical location relative to the electronic database 140.

Figure 2:
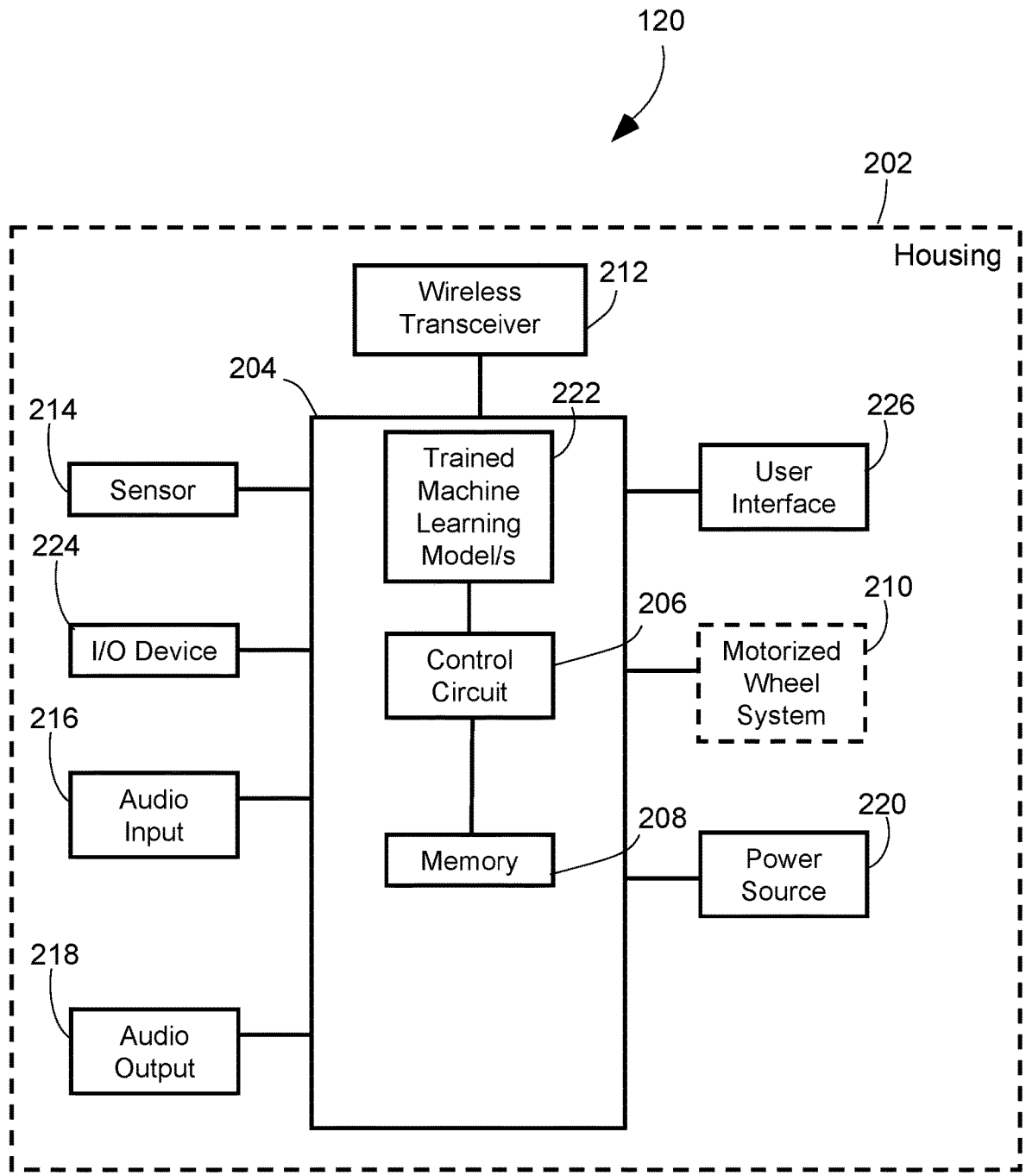
FIG. 2 comprises a block diagram of an exemplary image capture device in accordance with some embodiments.

FIG. 2 presents a more detailed example of an exemplary motorized robotic unit or image capture device 120. As mentioned above, the image capture device 120 does not necessarily need an autonomous motorized wheel-based and/or track-based system to move about the product storage facility 105, and may instead be moved (e.g., driven, pushed, carried, worn, etc.) by a human operator, or may be movably coupled to a track system (which may be above the floor level or at the floor level) that permits the image capture device 120 to move about the product storage facility 105 while capturing images of various product storage areas 110 of the product storage facility 105. In the example shown in FIG. 2, the motorized image capture device 120 has a housing 202 that contains (partially or fully) or at least supports and carries a number of components. These components include a control unit 204 comprising a control circuit 206 that controls the general operations of the motorized image capture device 120 (notably, in some implementations, the control circuit 310 of the computing device 150 may control the general operations of the image capture device 120). Accordingly, the control unit 204 also includes a memory 208 coupled to the control circuit 206 and that stores, for example, computer program code, operating instructions and/or useful data, which when executed by the control circuit implement the operations of the image capture device.

The control circuit 206 of the exemplary motorized image capture device 120 of FIG. 2, operably couples to a motorized wheel system 210, which, as pointed out above, is optional (and for this reason represented by way of dashed lines in FIG. 2). This motorized wheel system 210 functions as a locomotion system to permit the image capture device 120 to move within the product storage facility 105 (thus, the motorized wheel system 210 may be more generically referred to as a locomotion system). Generally, this motorized wheel system 210 may include at least one drive wheel (i.e., a wheel that rotates about a horizontal axis) under power to thereby cause the image capture device 120 to move through interaction with, e.g., the floor of the product storage facility 105. The motorized wheel system 210 can include any number of rotating wheels and/or other alternative floor-contacting mechanisms (e.g., tracks, etc.) as may be desired and/or appropriate to the application setting.

The motorized wheel system 210 may also include a steering mechanism of choice. One simple example may comprise one or more wheels that can swivel about a vertical axis to thereby cause the moving image capture device 120 to turn as well. It should be appreciated that the motorized wheel system 210 may be any suitable motorized wheel and track system known in the art capable of permitting the image capture device 120 to move within the product storage facility 105. Further elaboration in these regards is not provided here for the sake of brevity save to note that the aforementioned control circuit 206 is configured to control the various operating states of the motorized wheel system 210 to thereby control when and how the motorized wheel system 210 operates.

In the exemplary embodiment of FIG. 2, the control circuit 206 operably couples to at least one wireless transceiver 212 that operates according to any known wireless protocol. This wireless transceiver 212 can comprise, for example, a Wi-Fi-compatible and/or Bluetooth-compatible transceiver (or any other transceiver operating according to known wireless protocols) that can wirelessly communicate with the aforementioned computing device 150 via the aforementioned network 130 of the product storage facility 105. So configured, the control circuit 206 of the image capture device 120 can provide information to the computing device 150 (via the network 130) and can receive information and/or movement instructions from computing device 150. For example, the control circuit 206 can receive instructions from the computing device 150 via the network 130 regarding directional movement (e.g., specific predetermined routes of movement) of the image capture device 120 throughout the space of the product storage facility 105. These teachings will accommodate using any of a wide variety of wireless technologies as desired and/or as may be appropriate in a given application setting. These teachings will also accommodate employing two or more different wireless transceivers 212, if desired.

In the embodiment illustrated in FIG. 2, the control circuit 206 also couples to one or more on-board sensors 214 of the image capture device 120. These teachings will accommodate a wide variety of sensor technologies and form factors. According to some embodiments, the image capture device 120 can include one or more sensors 214 including but not limited to an optical sensor, a photo sensor, an infrared sensor, a 3-D sensor, a depth sensor, a digital camera sensor, a laser imaging, detection, and ranging (LIDAR) sensor, a mobile electronic device (e.g., a cell phone, tablet, or the like), a quick response (QR) code sensor, a radio frequency identification (RFID) sensor, a near field communication (NFC) sensor, a stock keeping unit (SKU) sensor, a barcode (e.g., electronic product code (EPC), universal product code (UPC), European article number (EAN), global trade item number (GTIN)) sensor, or the like.

By one optional approach, an audio input 216 (such as a microphone) and/or an audio output 218 (such as a speaker) can also operably couple to the control circuit 206. So configured, the control circuit 206 can provide a variety of audible sounds to thereby communicate with workers at the product storage facility 105 or other motorized image capture devices 120 moving about the product storage facility 105. These audible sounds can include any of a variety of tones and other non-verbal sounds. Such audible sounds can also include, in lieu of the foregoing or in combination therewith, pre-recorded or synthesized speech.

The audio input 216, in turn, provides a mechanism whereby, for example, a user (e.g., a worker at the product storage facility 105) provides verbal input to the control circuit 206. That verbal input can comprise, for example, instructions, inquiries, or information. So configured, a user can provide, for example, an instruction and/or query (.g., where is product storage structure number so-and-so?, how many products are stocked on product storage structure so-and-so? etc.) to the control circuit 206 via the audio input 216.

In the embodiment illustrated in FIG. 2, the motorized image capture device 120 includes a rechargeable power source 220 such as one or more batteries. The power provided by the rechargeable power source 220 can be made available to whichever components of the motorized image capture device 120 require electrical energy. By one approach, the motorized image capture device 120 includes a plug or other electrically conductive interface that the control circuit 206 can utilize to automatically connect to an external source of electrical energy to thereby recharge the rechargeable power source 220.

In some embodiments, the motorized image capture device 120 includes an input/output (I/O) device 224 that is coupled to the control circuit 206. The I/O device 224 allows an external device to couple to the control unit 204. The function and purpose of connecting devices will depend on the application. In some examples, devices connecting to the I/O device 224 may add functionality to the control unit 204, allow the exporting of data from the control unit 206, allow the diagnosing of the motorized image capture device 120, and so on.

In some embodiments, the motorized image capture device 120 includes a user interface 226 including for example, user inputs and/or user outputs or displays depending on the intended interaction with the user (e.g., worker at the product storage facility 105). For example, user inputs could include any input device such as buttons, knobs, switches, touch sensitive surfaces or display screens, and so on. Example user outputs include lights, display screens, and so on. The user interface 226 may work together with or separate from any user interface implemented at an optional user interface unit or user device 160 (such as a smart phone or tablet device) usable by a worker at the product storage facility 105. In some embodiments, the user interface 226 is separate from the image capture device 120, e.g., in a separate housing or device wired or wirelessly coupled to the image capture device 120. In some embodiments, the user interface 226 may be implemented in a mobile user device 160 carried by a person (e.g., worker at product storage facility 105) and configured for communication over the network 130 with the image capture device 120.

In some embodiments, the motorized image capture device 120 may be controlled by the computing device 150 or a user (e.g., by driving or pushing the image capture device 120 or sending control signals to the image capture device 120 via the user device 160) on-site at the product storage facility 105 or off-site. This is due to the architecture of some embodiments where the computing device 150 and/or user device 160 outputs the control signals to the motorized image capture device 120. These controls signals can originate at any electronic device in communication with the computing device 150 and/or motorized image capture device 120. For example, the movement signals sent to the motorized image capture device 120 may be movement instructions determined by the computing device 150; commands received at the user device 160 from a user; and commands received at the computing device 150 from a remote user not located at the product storage facility 105.

In the embodiment illustrated in FIG. 2, the control unit 204 includes a memory 208 coupled to the control circuit 206 and that stores, for example, computer program code, operating instructions and/or useful data, which when executed by the control circuit implement the operations of the image capture device. The control circuit 206 can comprise a fixed-purpose hard-wired platform or can comprise a partially or wholly programmable platform. These architectural options are well known and understood in the art and require no further description here. This control circuit 206 is configured (for example, by using corresponding programming stored in the memory 208 as will be well understood by those skilled in the art) to carry out one or more of the steps, actions, and/or functions described herein. The memory 208 may be integral to the control circuit 206 or can be physically discrete (in whole or in part) from the control circuit 206 as desired. This memory 208 can also be local with respect to the control circuit 206 (where, for example, both share a common circuit board, chassis, power supply, and/or housing) or can be partially or wholly remote with respect to the control circuit 206. This memory 208 can serve, for example, to non-transitorily store the computer instructions that, when executed by the control circuit 206, cause the control circuit 206 to behave as described herein.

In some embodiments, the control circuit 206 may be communicatively coupled to one or more trained computer vision/machine learning/neural network modules/models 222 to perform at some of the functions. For example, the control circuit 206 may be trained to process one or more images 180 of product storage areas 110 at the product storage facility 105 to detect and/or recognize one or more products 190 using one or more machine learning algorithms, including but not limited to Linear Regression, Logistic Regression, Decision Tree, SVM, Naïve Bayes, kNN, K-Means, Random Forest, Dimensionality Reduction Algorithms, and Gradient Boosting Algorithms. In some embodiments, the trained machine learning module/model 222 includes a computer program code stored in a memory 208 and/or executed by the control circuit 206 to process one or more images 180, as described in more detail below.

It is noted that not all components illustrated in FIG. 2 are included in all embodiments of the motorized image capture device 120. That is, some components may be optional depending on the implementation of the motorized image capture device 120. It will be appreciated that while the image capture device 120 of FIG. 2 is a motorized robotic unit capable of moving about the product storage facility 105 while being controlled remotely (e.g., by the computing device 150) and without being controlled by an onboard human operator, in some embodiments, the image capture device 120 may be configured to permit an onboard human operator (i.e., driver) to direct the movement of the image capture device 120 about the product storage facility 105.

Figure 3:
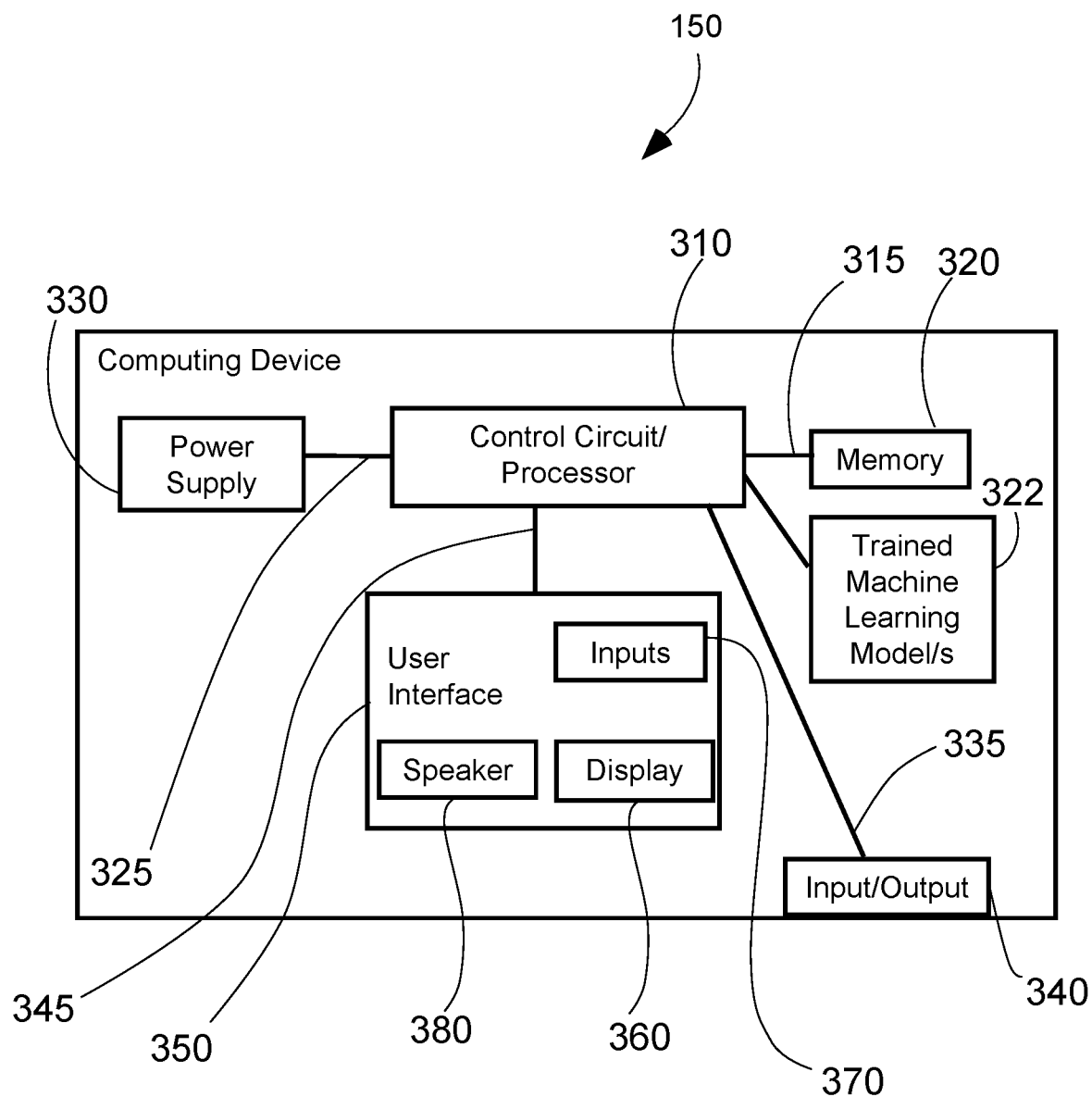
FIG. 3 is a functional block diagram of an exemplary computing device in accordance with some embodiments.

With reference to FIG. 3, the exemplary computing device 150 configured for use with exemplary systems and methods described herein may include a control circuit 310 including a programmable processor (e.g., a microprocessor or a microcontroller) electrically coupled via a connection 315 to a memory 320 and via a connection 325 to a power supply 330. The control circuit 310 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 310 can be configured (for example, by using corresponding programming stored in the memory 320 as will be well understood by those skilled in the art) to carry out one or more of the steps, actions, and/or functions described herein. In some embodiments, the memory 320 may be integral to the processor-based control circuit 310 or can be physically discrete (in whole or in part) from the control circuit 310 and is configured non-transitorily store the computer instructions that, when executed by the control circuit 310, cause the control circuit 310 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

Figure 4:
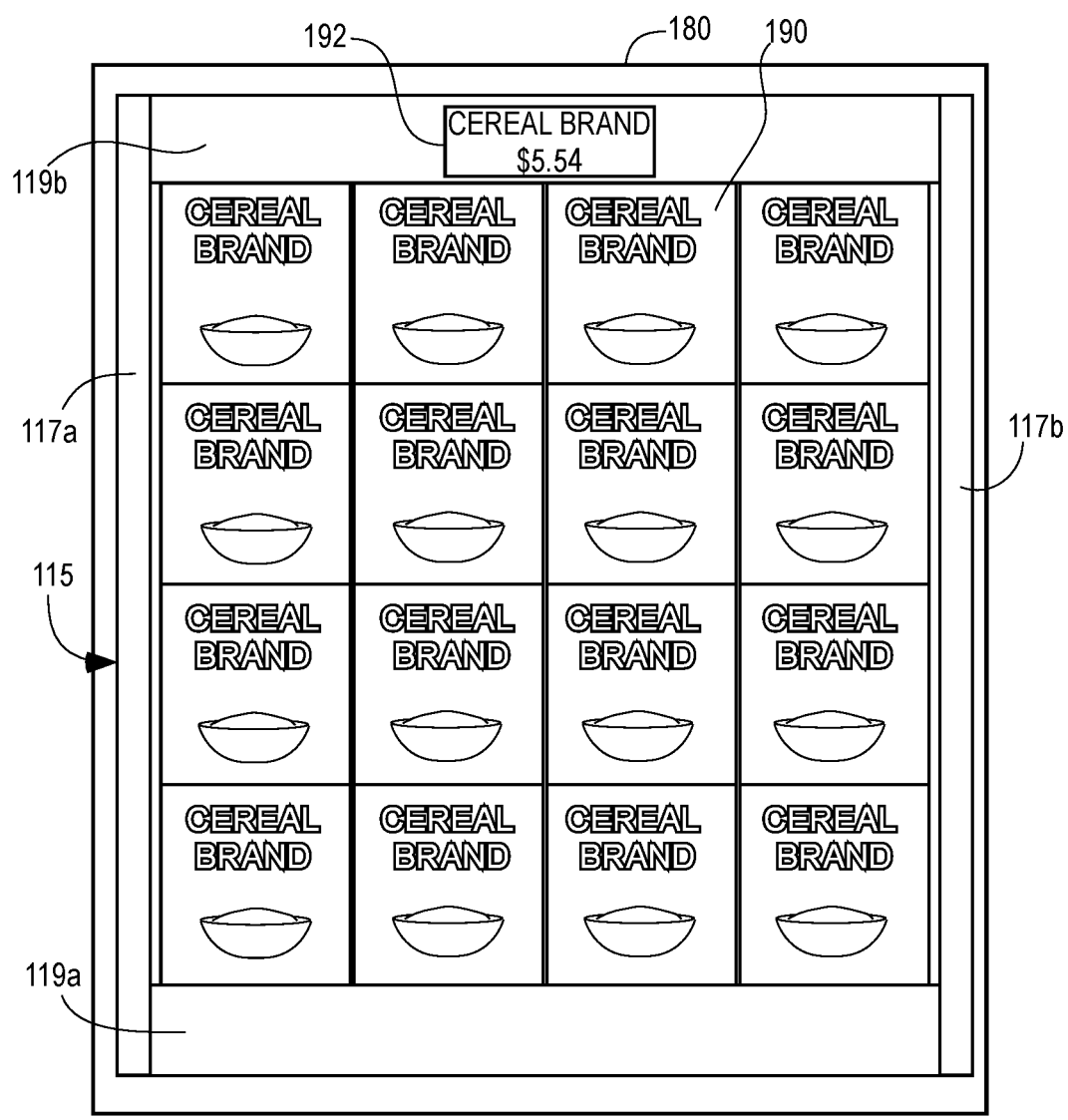
FIG. 4 is a diagram of an exemplary image of the product storage structure of FIG. 1 taken by the image capture device, showing the product storage structure of FIG. 1 and all of the products thereon.
Figure 5:
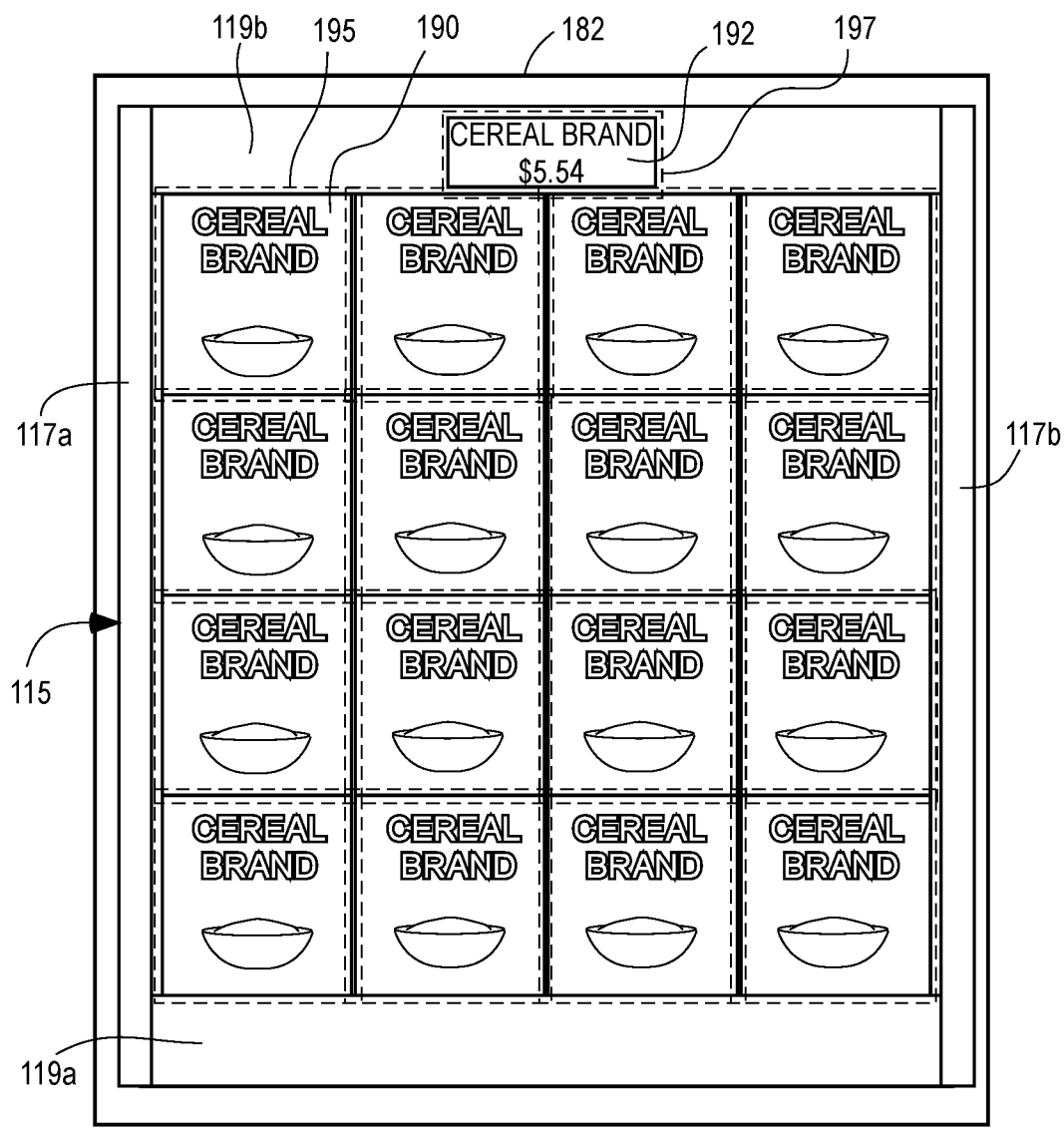
FIG. 5 is a diagram of the exemplary image of FIG. 4, after the image is processed to detect the individual products located on the product storage structure and to generate virtual boundary lines around each of the products detected in the image.
Figure 6:
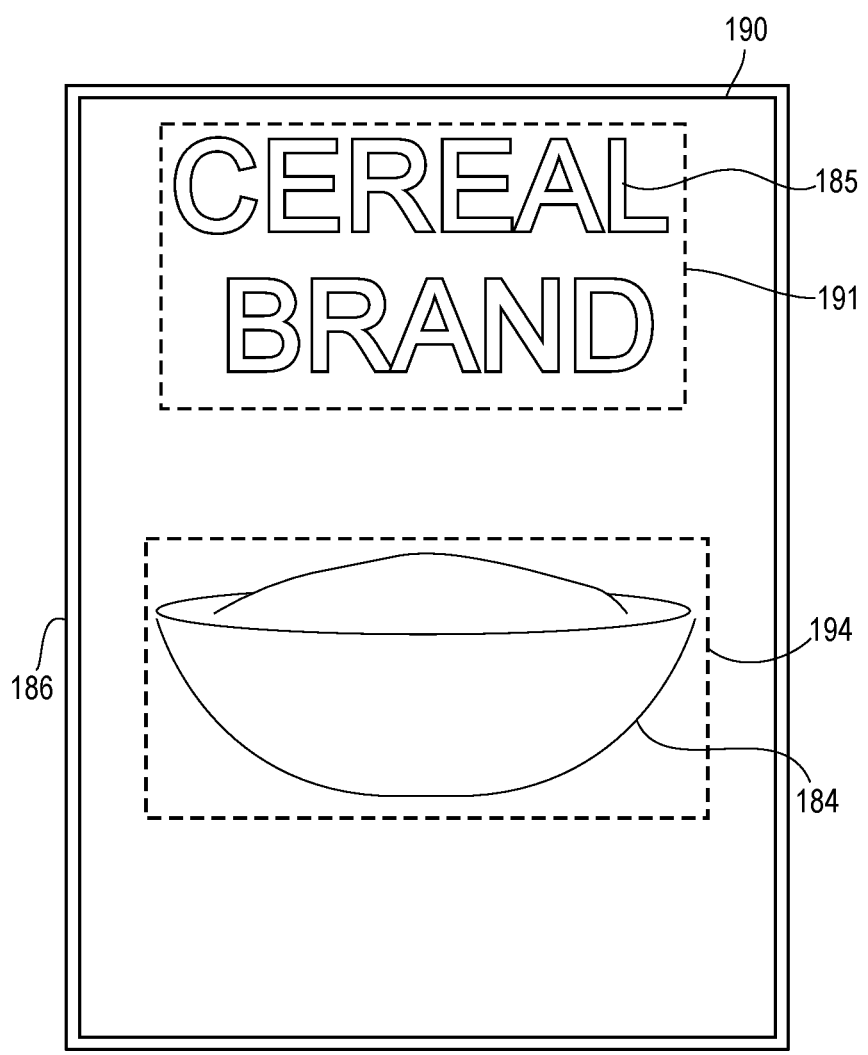
FIG. 6 is a diagram of an enlarged portion of the image of FIG. 5, after the image is processed to crop out an individual one of the products.

The control circuit 310 of the computing device 150 is also electrically coupled via a connection 335 to an input/output 340 that can receive signals from, for example, from the image capture device 120, the electronic database 140, internet-based service 170 (e.g., one or more of an image processing service, computer vision service, neural network service, etc.), and/or from another electronic device (e.g., an electronic device or user device 160 of a worker tasked with physically inspecting the product storage area 110 and/or the product storage structure 115 and observing the individual products 190 stocked thereon). The input/output 340 of the computing device 150 can also send signals to other devices, for example, a signal to the electronic database 140 including a raw image 180 of a product storage structure 115 as shown in FIG. 4, or a processed image 182 of the product storage structure 115 as shown in FIG. 5, or a cropped image 186 of the product 190 as shown in FIG. 6. Also, a signal may be sent by the computing device 150 via the input/output 340 to the image capture device 120 to, e.g., provide a route of movement for the image capture device 120 through the product storage facility 105.

The processor-based control circuit 310 of the computing device 150 shown in FIG. 3 is electrically coupled via a connection 345 to a user interface 350, which may include a visual display or display screen 360 (e.g., light-emitting diode (LED) screen) and/or button input 370 that provide the user interface 350 with the ability to permit an operator of the computing device 150 (e.g., worker at a the product storage facility 105 (or a worker at a remote regional center) tasked with monitoring the inventory and/or ensuring the product are correctly labeled at the product storage facility 105 to manually control the computing device 150 by inputting commands via touch-screen and/or button operation and/or voice commands. Possible commands may, for example, cause the computing device 150 to cause transmission of an alert signal to electronic mobile user device/s 160 of a worker/s at the product storage facility 105 to assign a task to the worker that requires the worker to, e.g., visually inspect and/or relabel and/or restock a given product storage structure 115 based on analysis by the computing device 150 of the image 180 of the product storage structure 115 captured by the image capture device 120.

In some embodiments, the user interface 350 of the computing device 150 may also include a speaker 380 that provides audible feedback (e.g., alerts) to the operator of the computing device 150. It will be appreciated that the performance of such functions by the processor-based control circuit 310 of the computing device 150 is not dependent on a human operator, and that the control circuit 310 of the computing device 150 may be programmed to perform such functions without a human operator.

As pointed out above, in some embodiments, the image capture device 120 moves about the product storage facility 105 (while being controlled remotely by the computing device 150 (or another remote device such one or more user devices 160)), or while being controlled autonomously by the control circuit 206 of the image capture device 120), or while being manually driven or pushed by a worker of the product storage facility 105. When the image capture device 120 moves about the product storage area 110 as shown in FIG. 1, the sensor 214 of the image capture device 120, which may be one or more digital cameras, captures (in sequence and at predetermined intervals) multiple images of the product storage area 110 and the product storage structure 115 from various angles. In certain aspects, the image capture device 120 is configured to move about the product storage area 110 while capturing one or more images 180 of the product storage structure 115 at certain predetermined time intervals (e.g., every 1 second, 5 seconds, 10 seconds, etc.). The images 180 captured by the image capture device 120 may be transmitted to the electronic database 140 for storage and/or to the computing device 150 for processing by the control circuit 310 and/or to a web-/cloud-based image processing service 170.

In some aspects, the control circuit 310 of the computing device 150 obtains (e.g., from the electronic database 140, or from an image-processing internet-based service 170, or directly from the image capture device 120) one or more raw or processed images 180 of the product storage area 110 captured by the image capture device 120 while moving about the product storage area 110. In particular, in some aspects, the control circuit 310 of the computing device 150 is programmed to process a raw image 180 (captured by the image capture device 120 and obtained by the computing device 150 from the electronic database 140 or from the image capture device 120) to extract the raw image data and meta data from the image. In some aspects, the image 180 captured by the image capture device 120 may be processed via web-/cloud-based image processing service 170, which may be installed on the computing device 150 (or communicatively coupled to the computing device 150) and executed by the control circuit 310.

In some embodiments, the meta data extracted from the image 180 captured by the image capture device 120, when processed by the control circuit 310 of the computing device 150, enables the control circuit 310 of the computing device 150 to detect the physical location of the portion of the product storage area 110 and/or product storage structure 115 depicted in the image 180 and/or the physical locations and characteristics (e.g., size, shape, etc.) of the individual products 190 and the price tag labels 192 depicted in the image 180.

With reference to FIGS. 4 and 5, in some aspects, the control circuit 310 of the computing device 150 is configured to process the data extracted from the image 180 captured by the image capture device 120 to detect the overall size and shape of each of the individual products 190 located on the product storage structure 115 captured in the image 180. In some embodiments, the control circuit 310 is configured to process the data extracted from the image 180 and detect each of the individual products 190 and the price tag label 192 in the image 180 by executing one or more machine learning and/or computer vision modules and/or trained neural network modules/models 322. In certain aspects, the neural network executed by the control circuit 310 may be a deep convolutional neural network.

The neural network module/model 322 may be trained using various data sets, including, but not limited to: raw image data extracted from the images 180 captured by the image capture device 120; meta data extracted from the images 180 captured by the image capture device 120; reference image data associated with reference images of various product storage structures 115 at the product storage facility 105; reference model cropped images 186 of various products 190 stocked and/or sold at the product storage facility 105; image histogram templates associated with the reference model cropped images 186, feature vector templates associated with the reference model cropped images 186, location information templates associated with the reference model cropped images 186, reference model cropped images of various price tag labels 192 applied to the product storage structures 115 at the product storage facility 105; planogram data associated with the product storage facility 105.

In some embodiments, the control circuit 310 may be trained to process one or more images 180 of product storage areas 110 at the product storage facility 105 to detect and/or recognize one or more products 190 using one or more computer vision/machine learning algorithms, including but not limited to Linear Regression, Logistic Regression, Decision Tree, SVM, Naïve Bayes, kNN, K-Means, Random Forest, Dimensionality Reduction Algorithms, and Gradient Boosting Algorithms. In some embodiments, the trained machine learning/neural network module/model 322 includes a computer program code stored in a memory 320 and/or executed by the control circuit 310 to process one or more images 180, as described herein. It will be appreciated that, in some embodiments, the control circuit 310 does not process the raw image 180 shown in FIG. 4 to result in the processed image 182 shown in FIG. 5, and that such processing is performed by an internet-based service 170, after which the processed image 182 is obtained by the control circuit 310 for further analysis.

In some aspects, the control circuit 310 is configured to process the data extracted from the image 180 via computer vision and one or more trained neural networks to detect each of the individual products 190 located on the product storage structure 115 in the image 180, and to generate virtual boundary lines 195 (as seen in image 182 in FIG. 5) around each one of the individual products 190 detected in the image 180. By the same token, in some aspects, the control circuit 310 is configured to process the data extracted from the image 180 via computer vision and one or more trained neural networks to detect the price tag label 192 located on the product storage structure 115 in the image 180, and to generate a virtual boundary line 199 (as seen in image 182 in FIG. 5) around the price tag label 192 detected in the image 180.

As seen in the image 182 in FIG. 5, the virtual boundary lines 195 extend about the outer edges of each of the individual products 190 located on the product storage structure 115, and form a perimeter around each of the individual products 190. Similarly, the virtual boundary lines 197 extend about the outer edges of the individual price tag label 192 located on the product storage structure 115, and form a perimeter around the price tag label 192. Generally, the control circuit 310 is programmed to interpret each of the virtual boundary lines 195 as surrounding only one individual product 190, to interpret the virtual boundary line 199 as surrounding only one individual price tag label 192.

In some embodiments, after generating the virtual boundary lines 195 around the products 190 and the virtual boundary lines 197 around the price tag label 192, the control circuit 310 of the computing device 150 is programmed to cause the computing device 150 to transmit a signal including the processed image 182 over the network 130 to the electronic database 140 for storage. In one aspect, this image 182 may be used by the control circuit 310 in subsequent image detection operations and/or training or retraining a neural network model with the aim of creating a reference model of a visual representation of each product 190. More specifically, in some implementations, the control circuit 310 is programmed to perform object detection analysis with respect to images subsequently captured by the image capture device 120 by utilizing machine learning/computer vision modules/models 322 that may include one or more neural network models trained using the image data stored in the electronic database 140. Notably, in certain aspects, the machine learning/neural network modules/models 322 may be retrained based on physical inspection of the product storage structure 115 and/or products 190 and/or price tag label 192 by a worker of the product storage facility 105, and in response to an input received from an electronic user device 160 of the worker.

In some embodiments, after the control circuit 310 processes the image 180 by the control circuit 310 of the computing device 150 to detect the individual products 190 within the image 180 and to generate virtual boundary lines 195 around each of the individual products 190, the control circuit 310 is programmed to further processes the image 182 to crop each individual product 190 from the image 182, thereby resulting in the cropped image 186 shown in FIG. 6. It will be appreciated that processing the image 182 to crop each individual product 190 from the image 182 and create the cropped image 186 is one example of the image processing that may be performed by the control circuit 310, and that, in some embodiments, instead of cropping out an image 186 of the product 190 from the image 182, the control circuit may copy/record the pixel data corresponding to the product 190 in the image 182, and just use the pixel data associated with the product 190 instead of using the cropped image 186 depicting the product 190. Then, the control circuit 310 further processes the cropped image 186 depicting the product 190 (or pixel data representing the product 190) as discussed in more detail below to create a reference model image that is stored in the electronic database 140 to facilitate recognition/identification of products 190 subsequently captured on the product storage structure 115 by the image capture device 120.

In some embodiments, the control circuit 310 processes the individual product 190 in the cropped image 186 (e.g., via optical character recognition (OCR)) to facilitate a recognition/identification of the product 190 in the cropped image 186. For example, the data extracted from the product 190 as a result of the OCR processing may include alphanumeric characters, such as name 185 of the product 190 (e.g., "CEREAL BRAND") and a non-alphanumeric image 184 of the product 190 (e.g., a bowl with cereal in it, etc.). In some embodiments, if the control circuit 310 is unable to perform OCR processing of the product 190 in the cropped image 186 (e.g., because the product 190 in the cropped image 186 is partially occluded), the control circuit 310 is programmed to generate an alert indicating that OCR processing of the product 190 in the cropped image 186 was not successful.

In some embodiments, after the control circuit 310 extracts the meta data (e.g., via OCR) from the exterior of the product 190 (or from the exterior of the packaging of the product 190) and detects a keyword in the extracted meta data, the control circuit 310 converts the detected keyword to a keyword instance that indicates the keyword (i.e., each letter or number or character of the keyword) and the location of the keyword on the product 190. For example, in the exemplary cropped image 186 of FIG. 6, the control circuit 310 detected the keyword "CEREAL BRAND" 185 (which indicates the brand name of the cereal product) on the product 190 and generated a virtual bounding box 191 around the detected product brand name 185 on the product 190. By the same token, the control circuit 310 detected the non-alphanumeric graphical object 184 (i.e., an image of a bowl with cereal in it) on the product 190 and generated a virtual bounding box 194 around the detected graphical object 184 on the product 190.

In some embodiments, after the keywords/images on the product 190 in the cropped image 186 are detected and the product 190 is identified, the control circuit 310 create a cluster of the cropped images 186 (see FIG. 8), such that each of the cropped images 186 in the cluster depicts one of the identified individual products (e.g., from the same perspective or from a different angle). To that end, in some embodiments, the control circuit is programmed to process each of the cropped images 186 to generate embeddings 187 for each of the cropped images 186, with the embeddings 187 being dense vector representations of the cropped images 186.

Figure 7:
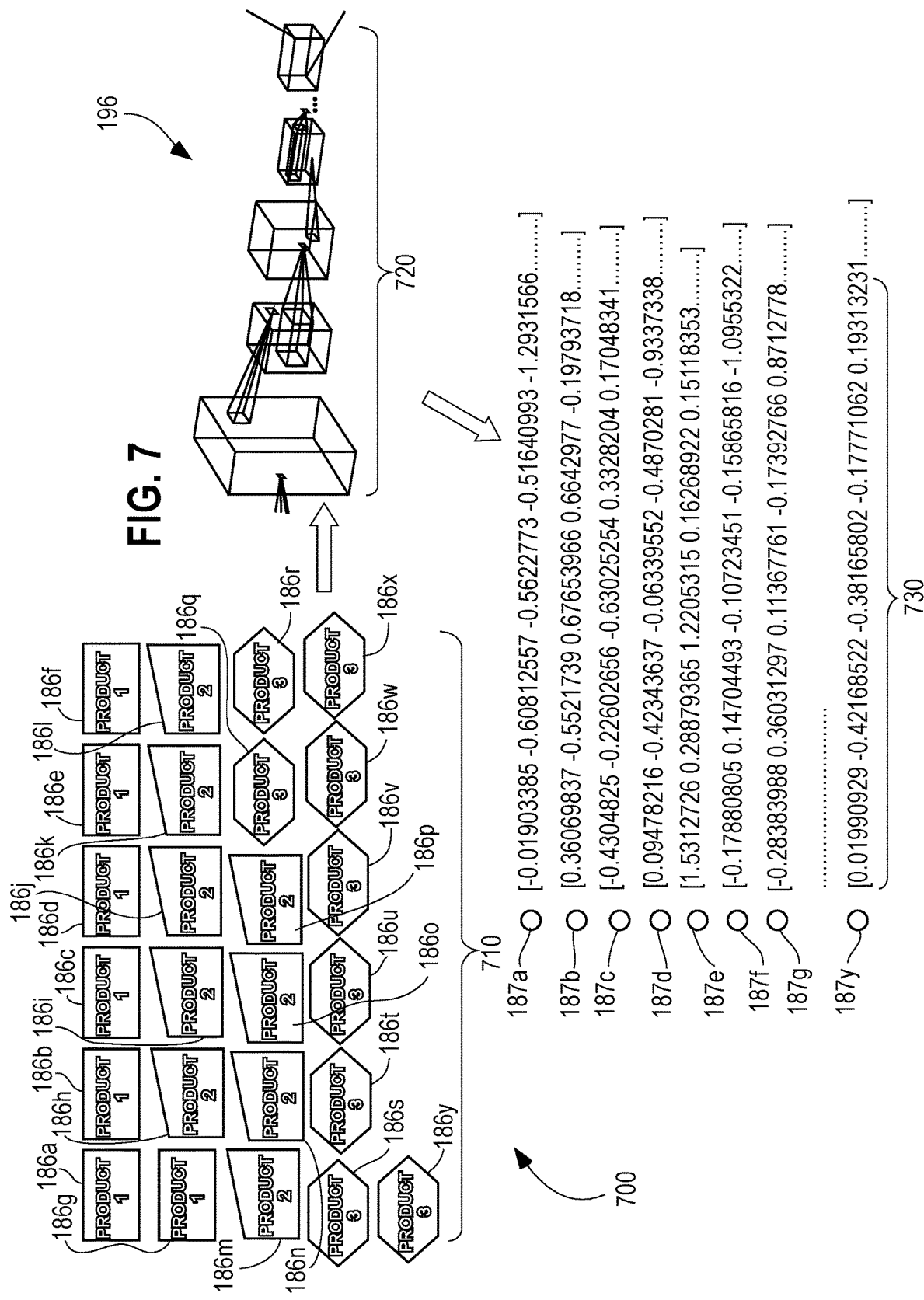
FIG. 7 is a flow diagram of an exemplary process of generating embeddings for a cropped images of individual products in accordance with some embodiments.

For example, FIG. 7 represents an exemplary process 700 of generating the embeddings 187 for the cropped images 186, and in the first step of this exemplary process 700, the control circuit 310 obtains a cropped images 186 of three different products 190, which were generated as described above with reference to FIGS. 4 and 5 (step 710). In the example shown in FIG. 7, in step 710, the control circuit 310 obtains 25 separate cropped images 186, where the first seven cropped images (i.e., 186a-186g) depict Product 1, the second nine cropped images (i.e., 186h-186p) depict Product 2 (which different from Product 1), and the remaining nine cropped images (i.e., 186q-186y) depict Product 3 (which is different from Products 2 and 3).

In the exemplary method 700, after the cropped images 186a-186y are obtained in step 710, the control circuit 310 passes the cropped images 186a-186y through a neural network 196. The neural network may be a convolutional neural network. In one aspect, the convolutional neural network (CNN) is pretrained to extract predetermined features from the cropped images 186a-186y (720) and, based on the features extracted from each of the cropped images 186a-186y, the CNN is pretrained to generate lower dimensional representations for each of the cropped images 186a-186y (step 730). For example, step 730 of the method 700 may include the CNN converting the features extracted from each of the cropped images 186a-186y into dense vector representations, also known as embeddings 187, for each of the textual features extracted from each of the cropped images 186a-186y.

In the illustrated embodiment, each of the dense vector representations or embeddings 187 is a numerical representation (i.e., represented by a set of numbers), which may be representative of 128 (or less or more) dimensions. These numeral representations or embeddings 187 reflect the visual information (i.e., predetermined features) extracted from the cropped images 186a-186y. As such, embeddings 187 having similar numerical inputs/values are indicative of cropped images 186 having similar products 190 depicted therein, and the control circuit 310 is programmed to place embeddings 187 having similar numerical inputs/values close together in an embedding space (e.g., a cluster, as will be discussed in more detail below with reference to FIG. 8). In the embodiment illustrated in FIG. 7, only dense vector embeddings 187a, 187b, 187c, 187d, 187e, 187f, 187g, and 187y corresponding to the cropped images 186a, 186b, 186c, 186d, 186e, 186f, 186g, and 187y are shown (due to space constraints), but it will be appreciated that in step 720, the passing of the cropped images 186a-186y through the pretrained CNN 196 results in the generation of a dense vector embeddings 187a-187y corresponding to each of the cropped images 186a-186y.

Figure 8:
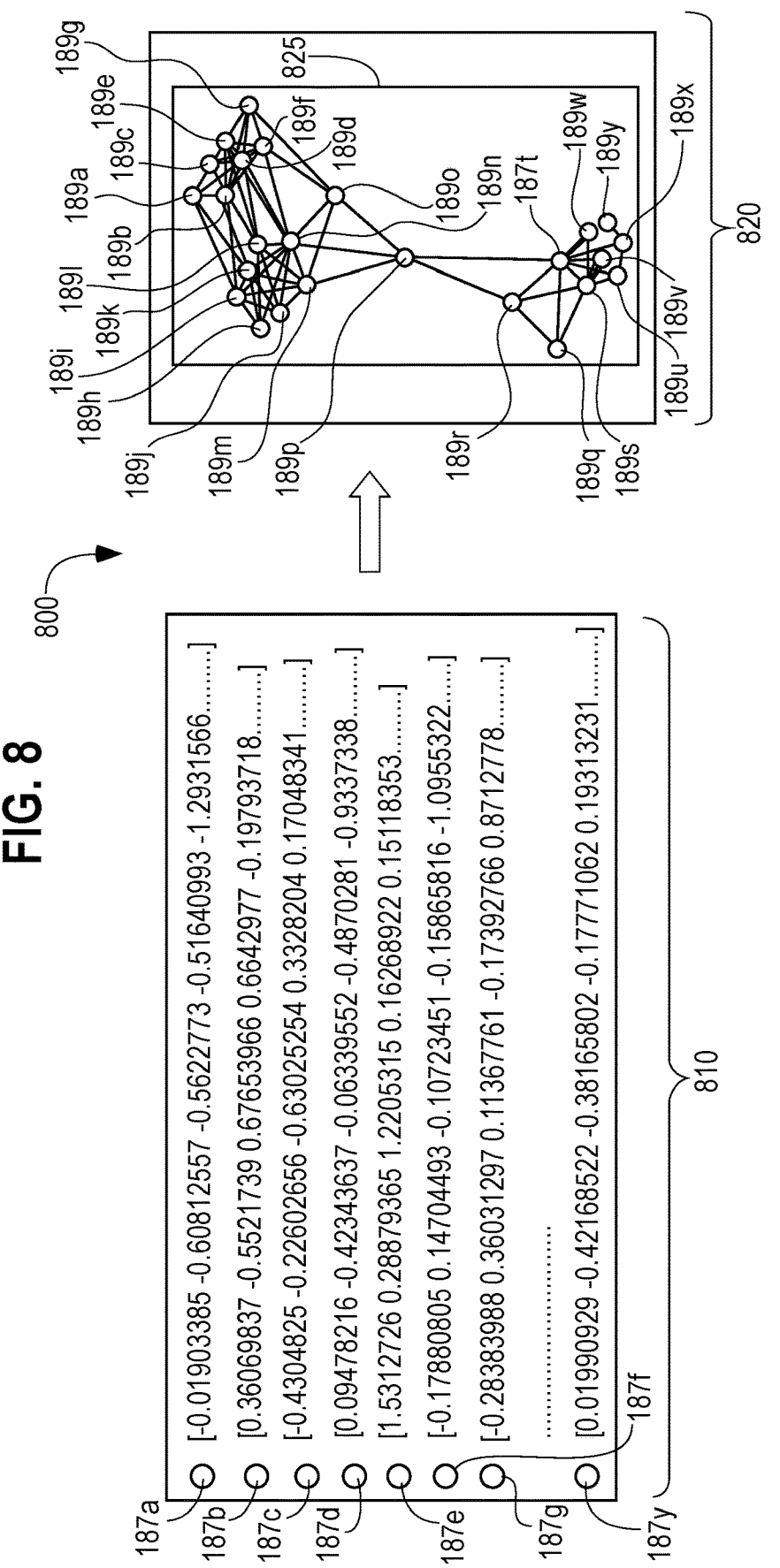
FIG. 8 is a flow diagram of an exemplary process of generating a cluster graph depicting clusters of the cropped images, wherein each cluster represents cropped images of an individual product in accordance with some embodiments.

In some implementations, the control circuit 310 is programmed to use the embeddings 187 of the cropped images 186 to create an image cluster graph 825 as shown in FIG. 8. In particular, in the exemplary method 800 depicted in FIG. 8, the control circuit 310 obtains the embeddings 187a-187y, for example, from the electronic database 140 (step 810), and then, based on the obtained embeddings 187a-187y, generates an image cluster graph 825, such that each node 189a-189y (depicted in FIG. 8 as a circular dot) corresponds to a respective one of the cropped images 186a-186y, and such that each of the nodes 189a-189y is positioned in the image cluster graph 825 based on the similarity (or a lack thereof) between the obtained embeddings 187a-187y (step 820).

In some aspects, the step 820 of generating the image cluster graph 825 includes the control circuit 310 using an appropriate predetermined threshold for distances to create edges between the nodes 189a-189y, and positioning the nodes 189a-189y into clusters using the Louvain method for community detection. As such, each cluster of nodes 189a-189y generated in the image cluster graph 825 represents a particular unique set of cropped images 186 having similar facings, lighting patterns, etc. In other words, based on the similarity of the embeddings 187a-187y generated for the cropped images 186a-186y, the nodes 189a-189g in FIG. 8 representing the cropped images 186a-186g of Product 1 are positioned close to each other as a first cluster, the nodes 189h-189p in FIG. 8 representing the cropped images 186h-186p of Product 2 are positioned close to each other as a second cluster, and the nodes 189q-189y in FIG. 8 representing the cropped images 186q-186y of Product 3 are positioned close to each other as a third cluster.

In certain embodiments, after the image cluster graph 825 is generated, the control circuit 310 is programmed to analyze the image cluster graph 825 and the nodes 189a-189y located in the image cluster graph 825 to select one cropped image 186 that is most representative of the cluster with respect to providing an optimal visual representation of the product 190 depicted in the cropped images 186 represented by the clustered nodes 189, making this selected cropped image 186 the keyword template reference image for the product 190. To that end, in one embodiment depicted in FIG. 9, a method 900 includes obtaining (e.g., from the electronic database 140) the image cluster graph 825 generated in step 820 of method 800 (step 910), and analyzing the embeddings 187a-187y associated with the cropped images 186a-186y and the relative positions of the nodes 189a-189y corresponding to the cropped images 186a-186y to identify and select a centroid for each of the clusters (step 920). In some embodiments, the control circuit 310 is programmed to identify a node 189 as a centroid for a given cluster of nodes 189 by calculating a sum of distances of each node 189 with respect to every other node 189 and choosing the node 189 with the least sum.

Figure 9:
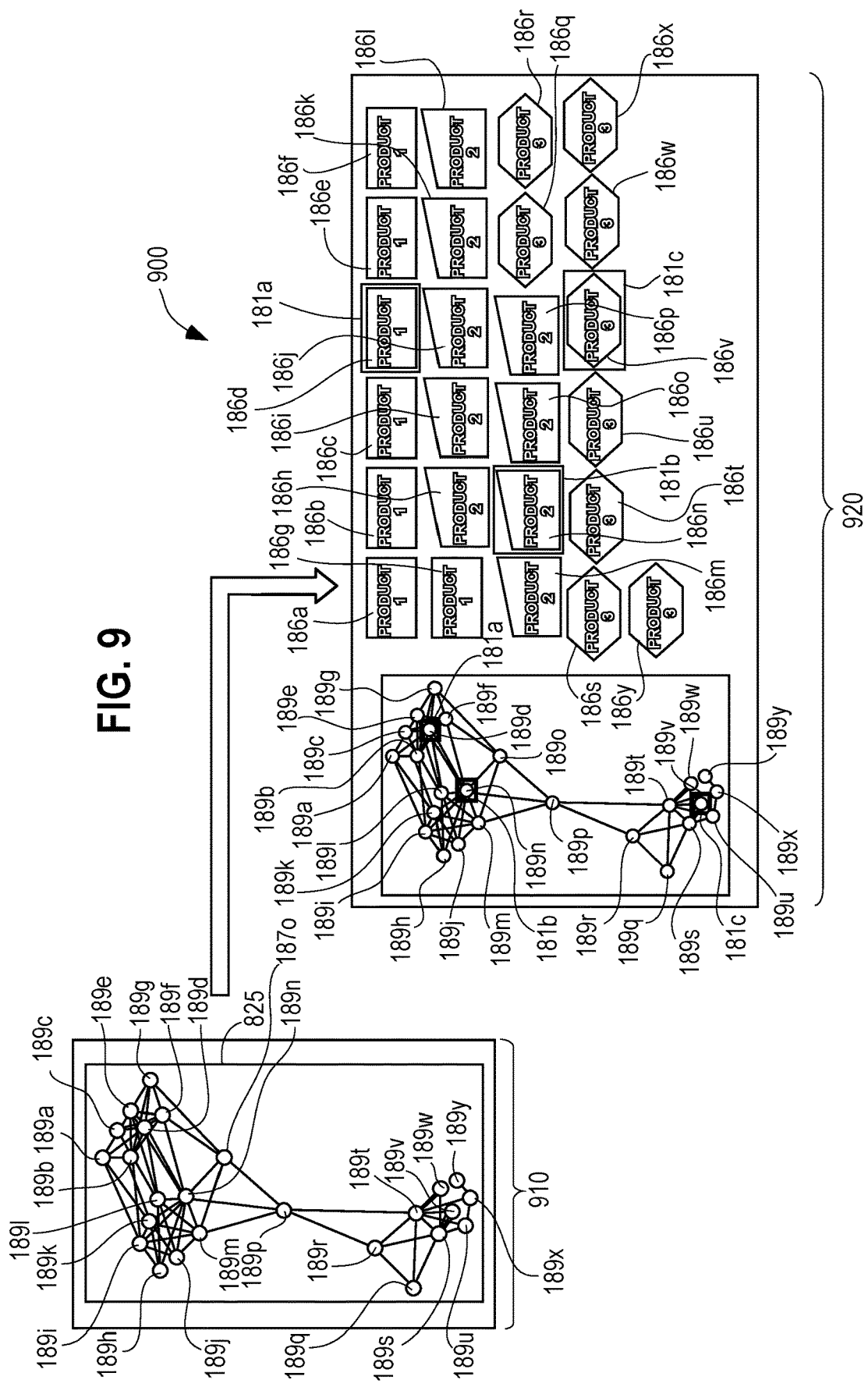
FIG. 9 is a flow diagram of an exemplary process of selecting a centroid image from the cropped image clusters of FIG. 8 in accordance with some embodiments.

In the example illustrated in FIG. 9, the analysis in step 920 resulted in the control circuit 310 selecting the node 189d as the centroid that represents an optimal representation of a keyword template reference image for the first cluster of cropped images 186a-186g (the selection of the node 189d by the control circuit 310 as the centroid is indicated in FIG. 9 by the line 181a surrounding the node 189d, but it will be appreciated that the line 181a is shown in FIG. 9 for ease of reference only). As can be seen in FIG. 9, the selection by the control circuit 310 of the node 189d as the centroid of the cluster of nodes 189a-189g representing the cropped images 186a-186g results in the cropped image 186d being identified and/or marked by the control circuit 310 as a keyword template reference image for Product 1, which is depicted in the cropped images 186a-186g. For example, the control circuit 310 may send a signal to the electronic database 140 to update the electronic database 140 to mark the cropped image 186d as the keyword template reference image for Product 1, such that the cropped image 186d will be utilized as a keyword template reference image in identification of the products 190 subsequently captured on the product storage structure 115 by the image capture device 120.

By the same token, in the example illustrated in FIG. 9, the analysis in step 920 resulted in the control circuit 310 selecting the node 189n as the centroid that represents an optimal representation of a keyword template reference image for the second cluster of cropped images 186h-186p. As can be seen in FIG. 9, the selection by the control circuit 310 of the node 189n as the centroid of the cluster of nodes 189h-189p representing the cropped images 186h-186p results in the cropped image 186n being identified and/or marked by the control circuit 310 as a keyword template reference image for Product 2, which is depicted in the cropped images 186h-186p. For example, the control circuit 310 may send a signal to the electronic database 140 to update the electronic database 140 to mark the cropped image 186n as the keyword template reference image for Product 2, such that the cropped image 186n will be utilized as a keyword template reference image in identification of the products 190 subsequently captured on the product storage structure 115 by the image capture device 120.

Similarly, in the example illustrated in FIG. 9, the analysis in step 920 resulted in the control circuit 310 selecting the node 189v as the centroid that represents an optimal representation of a keyword template reference image for the third cluster of cropped images 186q-186y. As can be seen in FIG. 9, the selection by the control circuit 310 of the node 189v as the centroid of the cluster of nodes 189q-189y representing the cropped images 186q-186y results in the cropped image 186v being identified and/or marked by the control circuit 310 as a keyword template reference image for Product 3, which is depicted in the cropped images 186q-186y. For example, the control circuit 310 may send a signal to the electronic database 140 to update the electronic database 140 to mark the cropped image 186v as the keyword template reference image for Product 3, such that the cropped image 186v will be utilized as a keyword template reference image in identification of the products 190 subsequently captured on the product storage structure 115 by the image capture device 120.

In some embodiments, after identifying the centroid node (i.e., 189d, 189n, and 189v) for each of the three node clusters and marking the corresponding cropped images (i.e., 186d, 186n, and 186v) as the keyword template reference images to facilitate future recognition/identification of products 190 in images 180 captured by the image capture device 120, the control circuit is also programmed to further process the image cluster graph 825 to generate a feature vector template reference image for each of the individual Products 1, 2, and 3. In one aspect, after identifying the centroid node (i.e., 189d, 189n, and 189v) for each of the three node clusters, the control circuit is programmed to resample a predetermined number of the cropped images 186 of each one of the respective clusters that are located closest to the centroid nodes 189d, 189n, and 189v.

In some implementations, the control circuit 310 is programmed to select a predetermined number (e.g., 3, 5, 10, 15, 20, etc.) of nodes 189 of a cluster that are located most proximally to their respective centroid nodes 189d, 189n, and 189v, and sample the cropped images 186 corresponding to the selected nodes 189 such that the centroid image 186d, 186n, and 186v of each cluster, and a predetermined number of the selected resampled images 186 (located in their respective cluster most proximally to their respective centroid image) are marked as a feature vector template reference image for the Product (e.g., 1, 2, or 3) associated with the cropped images 186a-186y. Such feature vector templates, which include not only the centroid images of each cluster, but also multiple images located in the cluster most proximally to the centroid image are highly representative of the cluster features and facilitate a more accurate prediction by the control circuit 310 of whether a given product detected in the image 180 subsequently captured by the image capture device 120 corresponds to any one of Product 1, Product 2, or Product 3.

In some aspects, the control circuit 310 may send a signal to the electronic database 140 to update the electronic database 140 to mark each centroid node 189d, 189n, and 189v of each cluster, in combination with the cropped images 186a-186y located most proximally to their respective centroid nodes 189d, 189n, and 189v in the cluster, as a feature vector template reference images to facilitate recognition/identification of the products 190 subsequently captured on the product storage structure 115 by the image capture device 120. In certain aspects, the control circuit 310 may transmit a signal to the electronic database 140 to update the electronic database 140 to replace the keyword template reference images and/or the feature vector template reference images associated with their respective Products 1, 2, or 3 with one or more images 186 that have been determined by the control circuit 310 to represent more optimal keyword template reference images and/or the feature vector template reference images of Products 1, 2, or 3. For example, if the control circuit 310 determines, based on analysis of new images 186 captured (e.g., on a different day) by the image capture device 120, that another cropped image 186 corresponds to the centroid node 189 in an updated cluster of the cropped images 186 of Product 1, the control circuit 310 may send a signal to the electronic database to unmark the cropped image 186 currently marked as the keyword template reference image of Product 1, and to mark this other cropped image 186 as the new centroid and the new keyword template reference image of Product 1.

Figure 10:
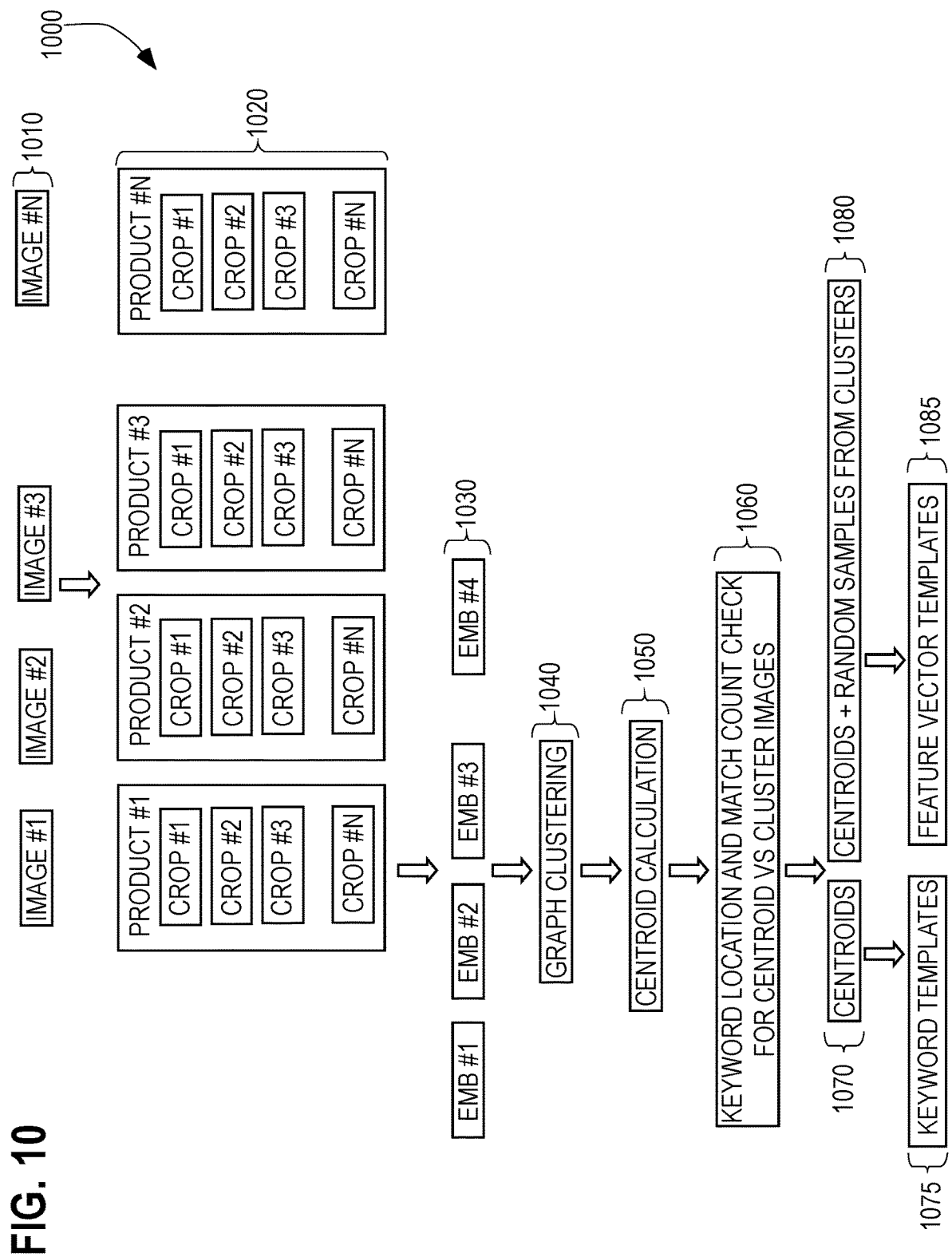
FIG. 10 is a flow diagram of an exemplary process of creating reference template images for detecting and recognizing products at a product storage facility in accordance with some embodiments.

FIG. 10 illustrates an exemplary method 1000 that reflects the exemplary operations described above. In particular, the method 1000 includes obtaining (e.g., by the control circuit 310 from the electronic database 140 or from an internet-based service 170) images 180 captured by the image capture device (step 1010). FIG. 10 shows an example, where three images 180 are obtained in step 1010, where Images #1-3 depict product storage structures 115, each of which stores multiple units of Products 1-3 (see FIG. 7), respectively. The method 1000 further includes processing the obtained images 180 (i.e., Images #1-3) to detect and identify the products 190 depicted therein, and cropping out each of the identified products 190 (i.e., Products 1-3) in separate cropped images 186 (step 1020). FIG. 10 shows that step 1020 generates a number of cropped images 186 (i.e., Crop #1, Crop #2, Crop #3 to Crop #n) depicting each of the Products 1-3. As discussed above with reference to FIG. 7, step 1020 may generate seven cropped images 186a-186g of Product 1, nine cropped images 186h-186p of Product 2, and nine cropped images 186q-186y of Product 3.

After the cropped images 186a-186y are generated in step 1020, the method 1000 further includes generating embeddings 187 (i.e., Emb #1, Emb #2, Emb #3 to Emb #N) for each of the cropped images 186, with the embeddings 187 being dense vector representations of the cropped images 186a-186y (step 1030). After the embeddings 187 are generated for each of the cropped images 186a-186y, the exemplary method 1000 further includes generating an image cluster graph 825 (see FIG. 8), where each node 189a-189y corresponds to a respective one of the cropped images 186a-186y, and each of the nodes 189a-189y being positioned in the image cluster graph 825 based on the similarity between the embeddings 187a-187y (step 1040). After the image cluster graph 825 is generated, the exemplary method 1000 further includes analyzing the image cluster graph 825 and the nodes 189a-189y located in the image cluster graph 825 to select one cropped image 186 of each cluster as the centroid image (step 1050). As pointed out above, in some implementations, the centroid of each of the clusters of nodes 189 is calculated by calculating a sum of distances of each node 189 with respect to every other node 189 and choosing the node 189 with the least sum.

After the centroid is selected for each cluster of nodes 189, the exemplary method 1000 further includes checking the similarity of textual features and their location for both the centroid image of each cluster, as well as the remaining images in each cluster to ascertain the centroid selection (step 1060). For example, with respect to the exemplary image cluster graph 825 of FIG. 9, step 1060 would include checking the similarity and locations of the textual features of Product 1 detected in the centroid image 186d (corresponding to node 189d) in comparison to the textual features of the remaining images 186a-186c and 186e-186g (corresponding to nodes 189a-189c and 189e-189g) to increase the likelihood that the centroid image 186d was calculated correctly.

If in step 1060 the control circuit 310 confirms that the centroid nodes 189d, 189n, 189v for each cluster of the nodes 189 were selected correctly, the method 1000 further includes marking a centroid node (i.e., 189d, 189n, and 189v in the example discussed with reference to FIG. 9), for example, by updating the electronic database 140 to identify the corresponding cropped images 186d, 186n, and 186v as centroids for the product 190 that they depict (step 1070). Following the centroid selection in step 1070, the exemplary method 1000 further includes sending a signal to the electronic database 140 to update the electronic database 140 to mark the centroid images 186d, 186n, 186v as the keyword template reference images for Product 1, Product 2, and Product 3, respectively (step 1075).

In addition to generating keyword template reference images for Products 1-3 identified in the images 180 from which the cropped images 186 were created, the exemplary method 1000 further includes processing the image cluster graph 825 to resample a predetermined number (e.g., 3, 5, 10, 15, 20, etc.) of the cropped images 186a-186y of each one of the respective clusters that are located closest to the centroid nodes 189d, 189n, and 189v (step 1080). Following the determination of the nodes 189 that are located in the image cluster graph 825 most proximally to the centroids 189d, 189n, and 189v or each cluster of nodes 189 and the resampling of a predetermined number (e.g., 20) of the cropped images 186 associated with the selected most proximal nodes 189 in step 1080, the exemplary method 1000 further includes sending a signal to the electronic database 140 to update the electronic database 140 to mark the centroid images 186d, 186n, 186v and their associated resampled most proximal cropped images 186 as the feature vector template reference images for Product 1, Product 2, and Product 3, respectively (step 1085). As pointed out above, the feature vector templates, which include not only the centroid images of each cluster, but also multiple images located in the cluster most proximally to the centroid image are highly representative of the cluster features and facilitate a more accurate prediction of whether a given product detected in the image 180 subsequently captured by the image capture device 120 corresponds to any one of Product 1, Product 2, or Product 3.

Figure 11:
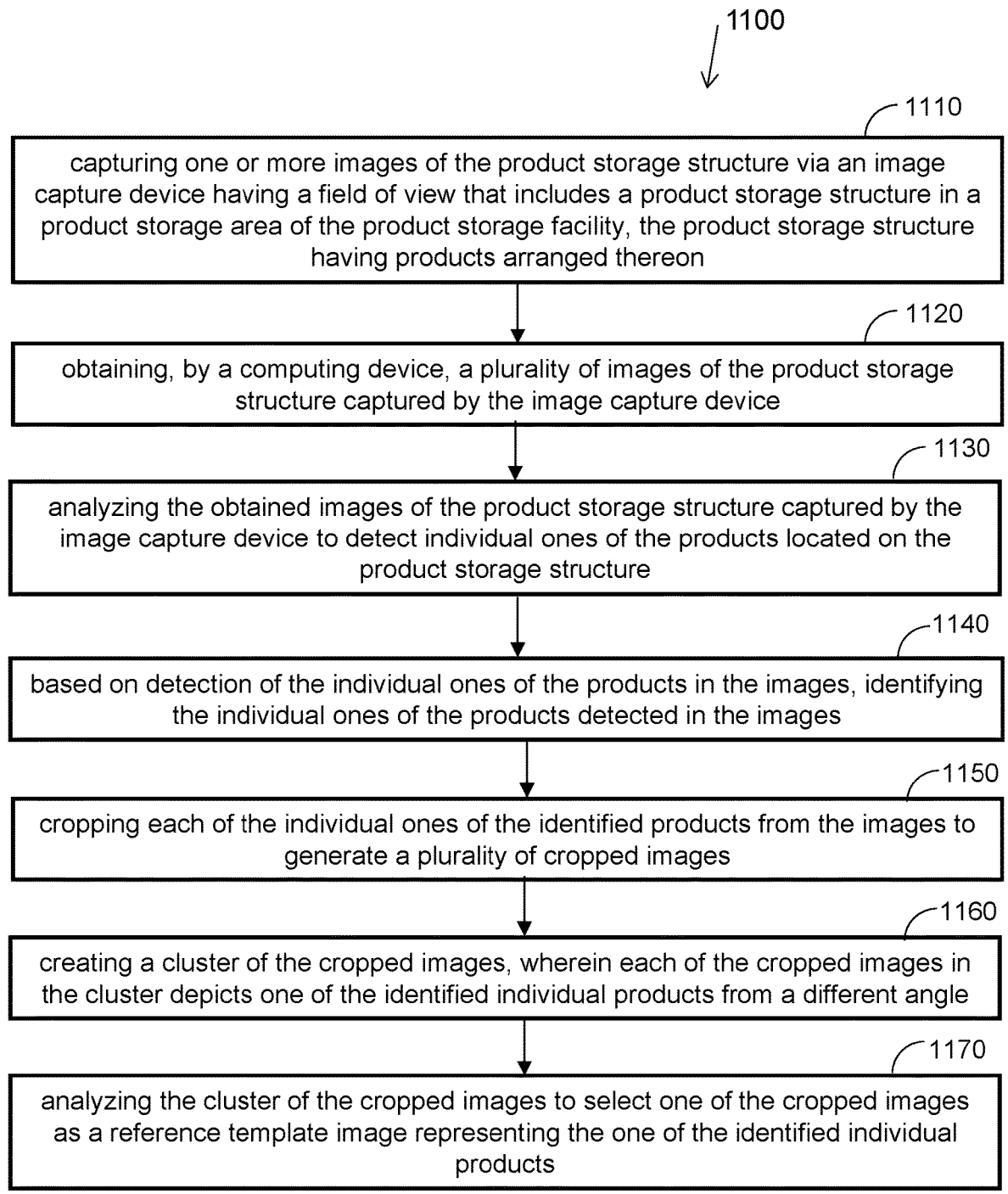
FIG. 11 is another flow diagram of an exemplary process of creating reference template images for detecting and recognizing products at a product storage facility in accordance with some embodiments.

With reference to FIG. 11, an exemplary method 1100 of creating reference template images for detecting and recognizing products 190 at product storage areas 110 of a product storage facility 105 is described. The method 1100 includes capturing one or more images 180 of the product storage structure 115 by an image capture device 120 having a field of view that includes the product storage structure 115, which has products 190 arranged thereon (step 1110). In some embodiments, the image capture device 120 moves about the product storage facility 105 (while being controlled remotely by the computing device 150 (or another remote device such one or more user devices 160)), or while being controlled autonomously by the control circuit 206 of the image capture device 120), or while being manually driven or pushed by a worker of the product storage facility 105.

When the image capture device 120 moves about the product storage area 110 as shown in FIG. 1, the sensor 214 of the image capture device 120, which may be one or more digital cameras, captures (in sequence and at predetermined intervals) multiple images of the product storage area 110 and the product storage structure 115 from various angles. As pointed out above, the image capture device 120 may move about the product storage area 110 while capturing images 180 of the product storage structure 115 at predetermined time intervals (e.g., every 1 second, 5 seconds, 10 seconds, etc.), and the images 180 captured by the image capture device 120 may be transmitted to an electronic database 140 for storage and/or to the computing device 150 for processing by the control circuit 310 and/or to a web-/cloud-based image processing service 170.

As pointed out above, the electronic database 140 of FIG. 1 may be configured as a single database, or a collection of multiple communicatively connected databases (e.g., digital image database, meta data database, inventory database, pricing database, customer database, vendor database, manufacturer database, etc.) and is configured to store various raw and processed images (e.g., 180, 182, 186) of the product storage area 110 and product storage structure 115 (and products 190 located thereon) captured by the image capture device 120 while the image capture device 120 is moving about the product storage facility 105.

The exemplary method 1100 of FIG. 11 further includes several actions performed by a computing device 150 including a control circuit 310 and communicatively coupled to the image capture device 120. In particular, the method 1100 includes obtaining at least one image 180 of the product storage structure 115 captured by the image capture device 120 (step 1120). As pointed out above, the computing device 150 may obtain the image 180 directly from the image capture device 120 (e.g., over the network 130 via the wireless transceiver 212 of the image capture device and the input/output 340 of the computing device 150), or from the electronic database 140 (e.g., over the network 130 via the input/output 340 of the computing device over the network 130), or from an internet-based service 170 (which may process the image 180 as described above to result in the image 182 and/or processes the image 182 to result in the cropped image 186 of the product 190, such that, in step 1120, the computing device 150 does not obtain the raw image 180, but obtains the processed image 182 and/or 186).

In the illustrated embodiment, after the control circuit 310 obtains the image 180, the method 1100 further includes the control circuit 310 of the computing device 150 analyzing the image 180 of the product storage structure 115 captured by the image capture device 120 to detect individual ones of the products 190 located on the product storage structure 115 (step 1130). As pointed out above, in some embodiments, the control circuit 310 analyzes the images 180 to detect each of the individual products 190 located on the product storage structure 115 in the image 180, and to generate virtual boundary lines 195 (as seen in image 182 in FIG. 5) around each one of the individual products 190 detected in the image 180. The exemplary method 1100 further includes, based on detection of the individual ones of the products 190 located on the product storage structure 115, identifying the individual products 190 in the captured image 180 (step 1140). As pointed out above, in some aspects, the identification of the individual products 190 may include processing the image 180 (captured by the image capture device 120 and obtained by the computing device 150 from the electronic database 140 or from the image capture device 120) to extract the raw image data and meta data from the image 180 and, more particularly, extracting one or more alphanumeric characters from the individual products 190. As pointed out above, the characters that may be extracted (e.g., by OCR processing) from the product 190 in the image 182 may include the name 185 of the product 190 (e.g., "CEREAL BRAND"), as well as the non-alphanumeric image 184 (e.g., a bowl) on the product 190.

With reference to FIG. 11, after the control circuit 310 identifies the individual products 190 in the processed image 182, the exemplary method 1100 includes the control circuit 310 cropping each of the individual identified individual products 190 from the image 182 to generate a plurality of cropped images 186 as shown in FIG. 6 (step 1150). After generating the cropped images 186 in step 1150, the exemplary method 1100 further includes creating a cluster of the cropped images 186a-186y, wherein each of the cropped images (e.g., 186a-186g, 186h-186p, or 186q-186y) in the cluster depicts one of the identified individual products (e.g., Product 1, Product 2, or Product 3) (step 1160). After the clusters of the nodes 189a-189y corresponding to the cropped images 186a-186y are created in step 1160, the exemplary method 1100 further includes analyzing the image cluster graph 825 and the nodes 189a-189y located in the image cluster graph 825 to select one cropped image 186 that is most representative of the cluster with respect to providing an optimal visual representation (i.e., a reference template image) of the product 190 depicted in the cropped images 186 represented by the clustered nodes 189, making this selected cropped image 186 (e.g., 186d, 186n, 186v) the reference template image for the respective product 190 with which the corresponding nodes (i.e., 189d, 189d, 189v) are associated (step 1070). As discussed above and discussed with reference to FIG. 9, the reference template that is created based on step 1070 may be a keyword template reference image or a feature vector reference image, which can be utilized as a reference template images to facilitate recognition/identification of the products 190 subsequently captured on the product storage structure 115 by the image capture device 120.

The above-described embodiments advantageously provide for inventory management systems and methods, where the individual products detected on the product storage structures of a product storage facility can be efficiently detected and identified. As such, the systems and methods described herein provide for an efficient and precise identification of products on product storage structures of a product storage facility and provide a significant cost savings to the product storage facility by saving the product storage facility thousands of worker hours that would be normally spent on manual on-hand product availability monitoring.

This application is related to the following applications, each of which is incorporated herein by reference in its entirety: entitled SYSTEMS AND METHODS OF SELECTING AN IMAGE FROM A GROUP OF IMAGES OF A RETAIL PRODUCT STORAGE AREA filed on Oct. 11, 2022, application Ser. No. 17/963,787; entitled SYSTEMS AND METHODS OF IDENTIFYING INDIVIDUAL RETAIL PRODUCTS IN A PRODUCT STORAGE AREA BASED ON AN IMAGE OF THE PRODUCT STORAGE AREA filed on Oct. 11, 2022, application Ser. No. 17/963,802; entitled CLUSTERING OF ITEMS WITH HETEROGENEOUS DATA POINTS filed on Oct. 11, 2022, application Ser. No. 17/963,903; entitled SYSTEMS AND METHODS OF TRANSFORMING IMAGE DATA TO PRODUCT STORAGE FACILITY LOCATION INFORMATION filed on Oct. 11, 2022, application Ser. No. 17/963,751; entitled SYSTEMS AND METHODS OF MAPPING AN INTERIOR SPACE OF A PRODUCT STORAGE FACILITY filed on Oct. 14, 2022, application Ser. No. 17/966,580; entitled SYSTEMS AND METHODS OF DETECTING PRICE TAGS AND ASSOCIATING THE PRICE TAGS WITH PRODUCTS filed on Oct. 21, 2022, application Ser. No. 17/971,350; and entitled SYSTEMS AND METHODS OF USING CACHED IMAGES TO DETERMINE PRODUCT COUNTS ON PRODUCT STORAGE STRUCTURES OF A RETAIL FACILITY filed Jan. 24, 2023, application Ser. No. 18/158,969.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system of creating reference template images for detecting and recognizing products at product storage areas of a product storage facility, the system comprising:
an image capture device having a field of view that includes at least a portion of a product storage structure in a product storage area of the product storage facility, the product storage structure having products arranged thereon, wherein the image capture device is configured to capture one or more images of the product storage structure; and
a computing device including a control circuit, the computing device being communicatively coupled to the image capture device, the control circuit being configured to:
receive, from the computing device, directional movement instructions;
obtain, using a sensor communicatively coupled to the control circuit, based on the directional movement instructions received, a plurality of images of the product storage structure captured by the image capture device;
analyze the obtained images of the product storage structure captured by the image capture device to detect individual ones of the products located on the product storage structure;
based on detection of the individual ones of the products in the images, recognize the individual ones of the products detected in the images as corresponding to a known product identifier;
crop each of the individual ones of the recognized products from the images to generate a plurality of cropped images;
create a cluster of the cropped images, wherein each of the cropped images in the cluster depicts one of the recognized individual products; and
analyze the cluster of the cropped images to select one of the cropped images as a reference template image representing the one of the recognized individual products.

2. The system of claim 1, wherein the image capture device comprises a motorized robotic unit that includes wheels that permit the motorized robotic unit to move about the product storage facility, and a camera to permit the motorized robotic unit to capture the one or more images of the product storage structure.

3. The system of claim 1, wherein the control circuit is programmed to generate virtual boundary lines each of the obtained images, wherein each of the virtual boundary lines surrounds an individual one of the products captured in the obtained images.

4. The system of claim 1, wherein the control circuit is programmed to generate embeddings for each of the cropped images, wherein the embeddings represent dense vector representations of the images.

5. The system of claim 4, wherein the control circuit is programmed to generate the embeddings for each of the cropped images using a convolutional neural network pre-trained to extract predetermined features from the cropped images and to generate a lower dimensional representation of the cropped images.

6. The system of claim 5, wherein the control circuit is programmed to:
group the cropped images containing the embeddings into the cluster, wherein each of the cropped images in the cluster depicts one of the recognized individual products; and
select a centroid image of the cluster of the cropped images, wherein the centroid image is determined by the control circuit to represent a keyword template reference image of the one of the recognized individual products.

7. The system of claim 6, wherein the control circuit is programmed to:
determine a similarly of the embeddings between the cropped images in the cluster; and position the cropped images in the cluster based on a similarity between the embeddings of the cropped images in the cluster.

8. The system of claim 6, wherein, after selection of the centroid image of the cluster of the cropped images, the control circuit is programmed to:
   resample a predetermined number of images of the cluster of the cropped images that are located closest to the centroid image; and
   mark the centroid and the resampled images as feature vector template reference images of the one of the recognized individual products.

9. The system of claim 8, further comprising an electronic database that stores the keyword template reference images and the feature vector template reference images associated with each one of the recognized individual products to facilitate recognition of the products subsequently captured in at least one new image of the product storage structure by the image capture device.

10. The system of claim 9, wherein the control circuit is programmed to replace the one of the cropped images as the keyword template reference images or the feature vector template reference images of the one of the recognized individual products in response to a determination by the control circuit that another cropped image obtained from the at least one new image represents the centroid in an updated cluster of the cropped images of the one of the recognized individual products.

11. A method of creating reference template images for detecting and recognizing products at product storage areas of a product storage facility, the method comprising:
   capturing one or more images of a product storage structure in a product storage area of the product storage facility via an image capture device having a field of view that includes the product storage structure, the product storage structure having products arranged thereon; and
   by a computing device including a control circuit and communicatively coupled to the image capture device:
      receiving, from the computing device, directional movement instructions;
      obtaining, using a sensor communicatively coupled to the control circuit, based on the directional movement instructions received, a plurality of images of the product storage structure captured by the image capture device;
      analyzing the obtained images of the product storage structure captured by the image capture device to detect individual ones of the products located on the product storage structure;
      based on detection of the individual ones of the products in the images, recognizing the individual ones of the products detected in the images as corresponding to a known product identifier;
      cropping each of the individual ones of the recognized products from the images to generate a plurality of cropped images;
      creating a cluster of the cropped images, wherein each of the cropped images in the cluster depicts one of the recognized individual products; and
      analyzing the cluster of the cropped images to select one of the cropped images as a reference template image representing the one of the recognized individual products.

12. The method of claim 11, wherein the image capture device comprises a motorized robotic unit that includes wheels that permit the motorized robotic unit to move about the product storage facility, and a camera to permit the motorized robotic unit to capture the one or more images of the product storage structure.

13. The method of claim 11, further comprising, by the control circuit, generating virtual boundary lines each of the obtained images, wherein each of the virtual boundary lines surrounds an individual one of the products captured in the obtained images.

14. The method of claim 11, further comprising, by the control circuit, generating embeddings for each of the cropped images, wherein the embeddings represent dense vector representations of the images.

15. The method of claim 14, further comprising, by the control circuit, generating the embeddings for each of the cropped images using a convolutional neural network pre-trained to extract predetermined features from the cropped images and to generate a lower dimensional representation of the cropped images.

16. The method of claim 15, further comprising, by the control circuit:
   grouping the cropped images containing the embeddings into the cluster, wherein each of the cropped images in the cluster depicts one of the recognized individual products; and
   selecting a centroid image of the cluster of the cropped images, wherein the centroid image is determined by the control circuit to represent a keyword template reference image of the one of the recognized individual products.

17. The method of claim 16, further comprising, by the control circuit:
   determining a similarly of the embeddings between the cropped images in the cluster; and
   positioning the cropped images in the cluster based on a similarity between the embeddings of the cropped images in the cluster.

18. The method of claim 16, further comprising, after selection of the centroid image of the cluster of the cropped images and by the control circuit:
   resampling a predetermined number of images of the cluster of the cropped images that are located closest to the centroid image; and
   marking the centroid and the resampled images as feature vector template reference images of the one of the recognized individual products.

19. The method of claim 18, further comprising storing the keyword template reference images and the feature vector template reference images a associated with each one of the recognized individual products in an electronic database to facilitate recognition of the products subsequently captured in at least one new image of the product storage structure by the image capture device.

20. The method of claim 19, further comprising, by the control circuit, replacing the one of the cropped images as the keyword template reference images or the feature vector template reference images of the one of the recognized individual products in response to a determination by the control circuit that another cropped image obtained from the at least one new image represents the centroid in an updated cluster of the cropped images of the one of the recognized individual products.

\* \* \* \* \*